US009363516B2

(12) United States Patent
Van der Auwera et al.

(10) Patent No.: US 9,363,516 B2
(45) Date of Patent: Jun. 7, 2016

(54) DEBLOCKING CHROMA DATA FOR VIDEO CODING

(71) Applicant: Qualcomm Incorporated, San Diego, CA (US)

(72) Inventors: Geert Van der Auwera, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 13/744,019

(22) Filed: Jan. 17, 2013

(65) Prior Publication Data

US 2013/0188744 A1  Jul. 25, 2013

Related U.S. Application Data

(60) Provisional application No. 61/588,554, filed on Jan. 19, 2012, provisional application No. 61/705,525, filed on Sep. 25, 2012.

(51) Int. Cl.
*H04N 7/26* (2006.01)
*H04N 19/85* (2014.01)
*H04N 19/117* (2014.01)
*H04N 19/186* (2014.01)
*H04N 19/82* (2014.01)

(52) U.S. Cl.
CPC ....... *H04N 19/00903* (2013.01); *H04N 19/117* (2014.11); *H04N 19/186* (2014.11); *H04N 19/82* (2014.11); *H04N 19/85* (2014.11)

(58) Field of Classification Search
None
See application file for complete search history.

(56) References Cited

U.S. PATENT DOCUMENTS

| 2006/0078052 | A1* | 4/2006 | Dang ........................ 375/240.24 |
| 2006/0115002 | A1  | 6/2006 | Kim et al. |
| 2006/0133504 | A1* | 6/2006 | Jung et al. ................ 375/240.16 |
| 2007/0201564 | A1* | 8/2007 | Joch et al. ................ 375/240.29 |
| 2008/0024670 | A1* | 1/2008 | Chen ........................ H04N 9/66 348/624 |
| 2008/0043853 | A1* | 2/2008 | Kawa ................... H04N 19/176 375/240.29 |
| 2008/0123750 | A1* | 5/2008 | Bronstein ............. H04N 19/17 375/240.24 |

(Continued)

FOREIGN PATENT DOCUMENTS

WO    2012096614 A2    7/2012

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

(Continued)

*Primary Examiner* — Tracy Li
*Assistant Examiner* — Mohammad J Rahman
(74) *Attorney, Agent, or Firm* — Shumaker & Sieffert, P.A.

(57) ABSTRACT

A video coding device is configured to obtain an array of sample values. The sample values may be formatted according to a 4:2:0, 4:2:2, or 4:4:4 chroma format. The video coding device determines whether to apply a first filter to rows of chroma sample values associated with defined horizontal edges within the array. The video coding device determines whether to apply a second filter to columns of chroma sample values associated with defined vertical edges. The horizontal and vertical edges may be separated by a number of chroma samples according to a deblocking grid.

38 Claims, 12 Drawing Sheets

(56) References Cited

U.S. PATENT DOCUMENTS

| | | | | |
|---|---|---|---|---|
| 2008/0240252 | A1* | 10/2008 | He | 375/240.24 |
| 2009/0033799 | A1* | 2/2009 | Kim | H04N 9/78 348/665 |
| 2009/0279611 | A1* | 11/2009 | Gao | 375/240.24 |
| 2011/0103490 | A1* | 5/2011 | Kuo | 375/240.29 |
| 2012/0128257 | A1* | 5/2012 | Quan | G06K 9/00758 382/218 |
| 2012/0213438 | A1* | 8/2012 | Quan | G06K 9/00744 382/170 |
| 2012/0230423 | A1* | 9/2012 | Esenlik et al. | 375/240.24 |
| 2012/0257702 | A1* | 10/2012 | Narroschke et al. | 375/E07.027 |
| 2013/0101024 | A1* | 4/2013 | Van der Auwera | H04N 19/117 375/240.03 |
| 2013/0294525 | A1* | 11/2013 | Norkin et al. | 375/240.24 |
| 2014/0140401 | A1* | 5/2014 | Lee | H04N 19/00315 375/240.12 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2013/020341, dated Dec. 11, 2013, 5 pp.

International Preliminary Report on Patentability from International Application No. PCT/US2013/020341, dated Mar. 12, 2014, 9 pp.

Bross et al., "WD5: Working Draft 5 of High Efficiency Video Coding", Joint Collaborative Team on Video Coding, JCTVC-G1103, Nov. 21-30, 2011, 238 pp.

Bross et al., "High Efficiency Video Coding (HEVC) text specification draft 10 (for FDIS & Last Call)," Joint Collaborative Team on Video Coding, JCTVC-L1003_v34, Jan. 14-23, 2013, 310 pp.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "High efficiency video coding (HEVC) text specification draft 9," Joint Collaborative Team on Video Coding, JCTVC-K1003_v7, Oct. 10-19, 2012, 290 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Search Report and Written Opinion—PCT/US2013/022211—ISA/EPO—Apr. 18, 2013—13 pp.

International Telecommunication Union, "Advanced video coding for generic audiovisual services," Standardization Sector of ITU, Jun. 2011, 674 pp.

Norkin, A., et al., "CE12: Ericsson's and MediaTek's deblocking filter", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16 ); URL: http://wftp3.1tu .i nt/ a v -arch/jctvc-site/,No. JCTVC-F118, Aug. 9, 2011, XP030009141.

Norkin A et al.,"Description of Core Experiment 12: Deblocking filtering ", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG. 16) ; URL: http://wftp3.itu.int/av-arch/jctvc-site/, No. JCTVC-F912, Jul. 22, 2011, XP030009813.

Tai, et al. "Deblocking Filter for Low Bit Rate MPEG-4 Viedo" IEEE Transactions on circuits and systems for video technology, vol. 15, No. 6, Jun. 2005.

Wiegand et al., "WD2: Working Draft 2 of High-Efficiency Video Coding", Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011,193 pp.

Wiegand et al.,"WD1: Working Draft 1 of High-Efficiency Video Coding", Joint Collaborative Team on Video Coding, JCTVC-C403, Oct. 7-15, 2010, 137 pp.

\* cited by examiner

4:2:0 sample format

4:2:2 sample format

4:4:4 sample format

16x16 CU with 4:2:0 Sample Formatting

○ Luma Sample
⊗ Chroma Samples

Boundaries in a macroblock to be filtered
(Figure 8-10 in the H.264 standard
recommendation)

| p7$_0$ | p6$_0$ | p5$_0$ | p4$_0$ | p3$_0$ | p2$_0$ | p1$_0$ | p0$_0$ | q0$_0$ | q1$_0$ | q2$_0$ | q3$_0$ | q4$_0$ | q5$_0$ | q6$_0$ | q7$_0$ |
|---|---|---|---|---|---|---|---|---|---|---|---|---|---|---|---|
| p7$_1$ | p6$_1$ | p5$_1$ | p4$_1$ | p3$_1$ | p2$_1$ | p1$_1$ | p0$_1$ | q0$_1$ | q1$_1$ | q2$_1$ | q3$_1$ | q4$_1$ | q5$_1$ | q6$_1$ | q7$_1$ |
| p7$_2$ | p6$_2$ | p5$_2$ | p4$_2$ | p3$_2$ | p2$_2$ | p1$_2$ | p0$_2$ | q0$_2$ | q1$_2$ | q2$_2$ | q3$_2$ | q4$_2$ | q5$_2$ | q6$_2$ | q7$_2$ |
| p7$_3$ | p6$_3$ | p5$_3$ | p4$_3$ | p3$_3$ | p2$_3$ | p1$_3$ | p0$_3$ | q0$_3$ | q1$_3$ | q2$_3$ | q3$_3$ | q4$_3$ | q5$_3$ | q6$_3$ | q7$_3$ |
| p7$_4$ | p6$_4$ | p5$_4$ | p4$_4$ | p3$_4$ | p2$_4$ | p1$_4$ | p0$_4$ | q0$_4$ | q1$_4$ | q2$_4$ | q3$_4$ | q4$_4$ | q5$_4$ | q6$_4$ | q7$_4$ |
| p7$_5$ | p6$_5$ | p5$_5$ | p4$_5$ | p3$_5$ | p2$_5$ | p1$_5$ | p0$_5$ | q0$_5$ | q1$_5$ | q2$_5$ | q3$_5$ | q4$_5$ | q5$_5$ | q6$_5$ | q7$_5$ |
| p7$_6$ | p6$_6$ | p5$_6$ | p4$_6$ | p3$_6$ | p2$_6$ | p1$_6$ | p0$_6$ | q0$_6$ | q1$_6$ | q2$_6$ | q3$_6$ | q4$_6$ | q5$_6$ | q6$_6$ | q7$_6$ |
| p7$_7$ | p6$_7$ | p5$_7$ | p4$_7$ | p3$_7$ | p2$_7$ | p1$_7$ | p0$_7$ | q0$_7$ | q1$_7$ | q2$_7$ | q3$_7$ | q4$_7$ | q5$_7$ | q6$_7$ | q7$_7$ |

FIG. 6

DEBLOCKING CHROMA DATA FOR VIDEO CODING

This application claims the benefit of:
U.S. Provisional Application No. 61/588,554, filed Jan. 19, 2012; and
U.S. Provisional Application No. 61/705,525, filed Sep. 25, 2012, the entire contents of each are herein incorporated by reference.

TECHNICAL FIELD

This disclosure relates to video coding and more particularly to techniques for reconstructing video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The H.264 standard is described in ITU-T Recommendation H.264, Advanced Video Coding for generic audiovisual services, by the ITU-T Study Group, dated March 2005, which may be referred to herein as the H.264 standard or H.264 specification, or the H.264/AVC standard or specification. The Joint Video Team (JVT) continues to work on extensions to H.264/MPEG-4 AVC. The video devices may transmit, receive, encode, decode, and/or store digital video information more efficiently by implementing such video compression techniques.

The High Efficiency Video Coding (HEVC) test model (HM) processes blocks of video data referred to as coding units (CUs). A largest coding unit (LCU) may be partitioned into four sub-CUs, each of which may also be further partitioned into four sub-CUs. LCUs and sub-CUs thereof are generally referred to simply as CUs. The partitioning of an LCU and sub-CUs thereof is signaled in a quadtree data structure. Thus, unpartitioned CUs of an LCU correspond to leaf nodes of the quadtree data structure.

SUMMARY

In general, this disclosure describes techniques for deblocking video data. In particular, this disclosure describes techniques which may be useful for filtering video data formatted according a 4:2:2 or 4:4:4 chroma format.

In one example, a method for filtering reconstructed video data comprises obtaining an array of sample values, wherein the array is formatted according to a 4:2:2 chroma format; determining whether to apply a first filter to rows of chroma sample values associated with defined horizontal edges within the array, wherein the defined horizontal edges are separated by sixteen chroma sample values; and determining whether to apply a second filter to columns of chroma sample values associated with defined vertical edges within the array, wherein the defined vertical edges are separated by eight chroma sample values.

In one example, an apparatus for filtering reconstructed video data comprises a video coding device configured to: obtain an array of sample values, wherein the array is formatted according to a 4:2:2 chroma format; determine whether to apply a first filter to rows of chroma sample values associated with defined horizontal edges within the array, wherein the defined horizontal edges are separated by sixteen chroma sample values; and determine whether to apply a second filter to columns of chroma sample values associated with defined vertical edges within the array, wherein the defined vertical edges are separated by eight chroma sample values.

In one example, a computer program product comprises a computer-readable storage medium having instructions stored thereon that, when executed, cause one or more processors of a device for filtering reconstructed video data to: obtain an array of sample values, wherein the array is formatted according to a 4:2:2 chroma format; determine whether to apply a first filter to rows of chroma sample values associated with defined horizontal edges within the array, wherein the defined horizontal edges are separated by sixteen chroma sample values; and determine whether to apply a second filter to columns of chroma sample values associated with defined vertical edges within the array, wherein the defined vertical edges are separated by eight chroma sample values.

In one example, an apparatus for filtering reconstructed video data comprises means for obtaining an array of sample values, wherein the array is formatted according to a 4:2:2 chroma format; means for determining whether to apply a first filter to rows of chroma sample values associated with defined horizontal edges within the array, wherein the defined horizontal edges are separated by sixteen chroma sample values; and means for determining whether to apply a second filter to columns of chroma sample values associated with defined vertical edges within the array, wherein the defined vertical edges are separated by eight chroma sample values.

In one example, a method for filtering reconstructed video data comprises determining whether a video block is formatted according to one of a 4:2:0, 4:2:2, or 4:4:4 chroma formats, and deblocking chroma edges based on the determined chroma format, wherein deblocking is based on an 8×8 deblocking grid if the video block is formatted according to a 4:2:0 chroma format, an 8×16 deblocking grid if the video block is formatted according to a 4:2:2 chroma format, and a 16×16 deblocking grid if the video block is formatted according to a 4:4:4 chroma format.

In one example, an apparatus for filtering reconstructed video data comprises a video coding device configured to: determine whether a video block is formatted according to one of a 4:2:0, 4:2:2, or 4:4:4 chroma formats, and deblock chroma edges based on the determined chroma format, wherein deblocking is based on an 8×8 deblocking grid if the video block is formatted according to a 4:2:0 chroma format, an 8×16 deblocking grid if the video block is formatted according to a 4:2:2 chroma format, and a 16×16 deblocking grid if the video block is formatted according to a 4:4:4 chroma format.

In one example, a computer program product comprises a computer-readable storage medium having instructions stored thereon that, when executed, cause one or more processors of a device for filtering reconstructed video data to: determine whether a video block is formatted according to one of a 4:2:0, 4:2:2, or 4:4:4 chroma formats, and deblock chroma edges based on the determined chroma format, wherein deblocking is based on an 8×8 deblocking grid if the video block is formatted according to a 4:2:0 chroma format, an 8×16 deblocking grid if the video block is formatted according to a 4:2:2 chroma format, and a 16×16 deblocking grid if the video block is formatted according to a 4:4:4 chroma format.

In one example, an apparatus for filtering reconstructed video data comprises means for determining whether a video block is formatted according to one of a 4:2:0, 4:2:2, or 4:4:4 chroma formats, and means for deblocking chroma edges based on the determined chroma format, wherein deblocking is based on an 8×8 deblocking grid if the video block is formatted according to a 4:2:0 chroma format, an 8×16 deblocking grid if the video block is formatted according to a 4:2:2 chroma format, and a 16×16 deblocking grid if the video block is formatted according to a 4:4:4 chroma format.

The details of one or more examples are set forth in the accompanying drawings and the description below. Other features, objects, and advantages will be apparent from the description and drawings, and from the claims.

BRIEF DESCRIPTION OF DRAWINGS

FIG. 6 is a conceptual diagram illustrating a boundary between two neighboring video blocks.

DETAILED DESCRIPTION

Figure 1A:
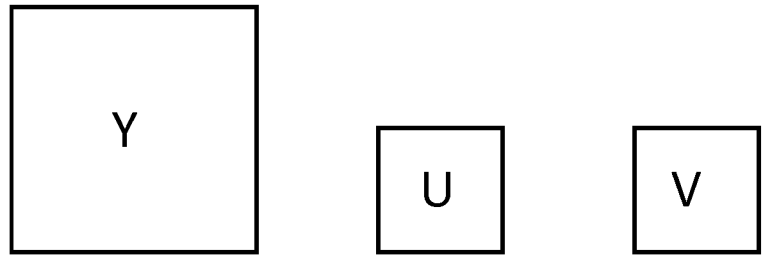
FIGS. 1A-1C are conceptual diagrams illustrating different sample formats for video data.

In general, HEVC defines deblocking filters for video data formatted according to the 4:2:0 chroma format. However, HEVC does not define deblocking filters for video data formatted according to either of the 4:2:2 or 4:4:4 chroma formats. The deblocking filters defined in HEVC may not deliver sufficient subjective quality for reconstructed video data formatted according to either of the 4:2:2 or 4:4:4 chroma formats. Further, deblocking filters defined in previous video coding standards and proposed deblocking filters for HEVC may be inefficient for deblock filtering video data reconstructed according to HEVC. Techniques are described herein that may be used to deblock filter reconstructed video data, e.g., for 4:2:2 and/or 4:4:4 chroma formats.

Efforts are currently in progress to develop a new video coding standard, currently referred to as High Efficiency Video Coding (HEVC). The upcoming standard is also referred to as H.265. The HEVC standard may also be referred to as ISO/IEC 23008-HEVC, which is intended to be the standard number for the delivered version of HEVC. HEVC standardization efforts are based on a model of a video coding device referred to as the HEVC Test Model (HM). The HM presumes improvements in the capabilities of video coding devices with respect to video coding devices available during the development of previous video coding standards. For example, whereas H.264 provides nine intra-prediction encoding modes, HEVC provides as many as thirty-five intra-prediction encoding modes.

A recent Working Draft (WD) of HEVC, referred to as "HEVC Working Draft 5" or "WD5," is described in document JCT-VC G1103_d3, Bross et al., "High-Efficiency Video Coding (HEVC) text specification draft 5," Joint Collaborative Team on Video Coding (JCT-VC) of ITU-T SG16 WP3 and ISO/IEC JTC1/SC29/WG11, 7$^{th}$ Meeting, Geneva, CH. Another recent working draft of HEVC, Working Draft 8, referred to as "HEVC Working Draft 8" or "WD8," is described in document HCTVC-J1003_d7, Bross et al., "High Efficiency Video Coding (HEVC) Text Specification draft 8," JCT-VC of ITU-T SG16 WP3 and ISO/IEC JTC1/SC29/WG11, 10th Meeting: Stockholm, Sweden, July, 2012. It should be noted that an HEVC Test Model may correspond to a particular HEVC working draft. In this case, the Test Model will be identified with a number. For example, HM5 may correspond to HEVC WD5.

A typical video encoder operating according to a video coding standard, such as the upcoming HEVC standard, partitions each frame (i.e., picture) of an original video sequence into contiguous rectangular regions called "blocks" or "coding units." These blocks may be encoded by applying spatial (intra-frame) prediction and/or temporal (inter-frame) prediction techniques to reduce or remove redundancy inherent in video sequences. A spatial prediction may be referred to as an "intra mode" (I-mode), and a temporal prediction may be referred to as an "inter mode" (P-mode or B-mode). Prediction techniques generate a predictive block of video data, which may also be referred to as a block of reference samples. A block of original video data to be coded is compared to the predictive block. The difference between the original block of video data and the predictive block may be referred to as residual data. Residual data is typically an array of the difference between pixel values of a predictive block and the original block of video data.

A transform, e.g., a discrete cosine transform (DCT), an integer transform, a wavelet transform, or a conceptually similar transform may be applied to the residual data during the coding process to generate a corresponding set of transform coefficients. Thus, the original block of video can be reconstructed by performing an inverse transform on the transform coefficients and adding the residual data to the predictive block. Transform coefficients may also be quantized. That is, the values of the transform coefficients may be represented as a bit string according to a defined bit-depth. In some cases, quantization may result in the representation of low value transform coefficients as zero. Quantized transform coefficients may be referred to as transform coefficient levels. For further compression the quantized transform coefficients may be entropy encoded according to a lossless entropy encoding method.

For video coding according to HEVC, a video frame may be partitioned into coding units. A coding unit (CU) generally refers to a rectangular image region that serves as a basic unit to which various coding tools are applied for video compression. A CU is typically square, and may be considered to be similar to a so-called "macroblock" described in other video coding standards such as, for example, ITU-T H.264. However, unlike a macroblock, a CU is not limited to 16×16 size. A CU may be considered an array of video sample values. Video sample values may also be referred to as picture elements, pixels, or pels. The size of a CU may be defined according to a number of horizontal and vertical samples. Thus, a CU may be described as an N×N or N×M CU.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

To achieve better coding efficiency, a CU may have variable sizes depending on video content. A CU usually has a luminance component, denoted as Y, and two chroma components, denoted as U and V. The two chroma components may correspond to red hues and blue hues and also be denoted by $C_b$ and $C_r$. According to HEVC, syntax data within a bitstream may define a largest coding unit (LCU), which is a largest CU for a frame or picture in terms of the number of samples. The size of a CU is usually defined according to the number of horizontal and vertical luma samples. Typically, an LCU includes 64×64 or 32×32 luma samples. CUs of other dimensions may be generated by recursively partitioning an LCU into sub-CUs. Syntax data for a bitstream may define a maximum number of times an LCU may be split, referred to as CU depth. Accordingly, a bitstream may also define a smallest coding unit (SCU). Typically, an SCU includes 8×8 luma samples. Thus, in one example, four 32×32 CUs may be generated by partitioning a 64×64 LCU into four sub-CUs and each of the 32×32 CUs may be further partitioned into sixteen 8×8 CUs. In general, the term coding unit (CU) may refer to an LCU or any sub-CU thereof (e.g., a sub-CU of an LCU or a sub-CU of another sub-CU).

An LCU may correspond to a quadtree data structure that includes one or more nodes, where a root node of the quadtree corresponds to the LCU itself and other nodes correspond to sub-CUs of the LCU. Thus, an LCU may also be referred to as a coding tree unit (CTU). The quadtree data structure may be referred to as a residual quadtree (RQT). An unpartitioned CU generally corresponds to a leaf node of the quadtree (that is, a node of the quadtree that does not have any child nodes).

Leaf node CUs generally include one or more prediction units (PUs) that describe how data for the CU is predicted, and one or more transform units (TUs). A PU may represent all or a portion of the corresponding CU, and may include data for retrieving a reference sample for the PU. PUs may have square or rectangular shapes. For example, if a CU is coded using an inter-prediction, it may include into four rectangular PUs where each PU includes information identifying a set reference samples in a temporally adjacent frame. The sets of reference samples may be combined to form a predictive video block. As described above, the predictive video block may be subtracted from the CU to form residual data. HEVC WD5 includes the following defined PU types: 2N×2N, N×N, 2N×N, N×2N, 2N×nU, 2N×nD, nR×2N, and nL×2N. Further, it should be noted that the ITU-T H.264 standard supports intra prediction in various block sizes, such as 16 by 16, 8 by 8, or 4 by 4 for luma components, and 8 by 8 for chroma components, as well as inter prediction in various block sizes, such as 16×16, 16×8, 8×16, 8×8, 8×4, 4×8 and 4×4 for luma components and corresponding scaled sizes for chroma components.

As described above, a transform may be applied to residual data to transform the residual data from a pixel domain to a transform domain. A TU or transform block may correspond to a set of residual data to which a transform is applied. TUs represent the size of a set of pixel difference values for purposes of performing transformation and generating a corresponding set of transform coefficients. The size of a TU may be the same as the size of a CU or a CU may be partitioned into a plurality of TUs. For example, one transform may be performed on the residual values associated with the 16×16 array of luma samples or a transform may be performed on each of four 8×8 arrays of luma samples. Larger TUs generally provide more compression with more perceivable "blockiness" in a reconstructed image, whereas smaller TUs generally provide less compression with less perceivable "blockiness." The selection of TU sizes may be based on rate-distortion optimization analysis. Rate-distortion analysis generally determines an amount of distortion (or error) between a reconstructed block and an original, (i.e., unencoded block) as well as a bitrate (that is, a number of bits) used to encode the block.

Similar to an LCU, a TU may be recursively partitioned into smaller TUs. The TUs that result from partitioning a TUs into smaller TUs may be referred to as a transform block structure. An example of a transform block structure is the so-called tree structure. The tree structure may code a transform block as either being a whole TU or as being divided into a number of smaller TUs. This process can be done recursively for each block at every different decomposition level.

Thus, according to the HEVC, a CU may include one or more prediction units (PUs) and/or one or more transform units (TUs). This disclosure also uses the term "block", "partition," or "portion" to refer to any of a CU, PU, or TU. In general, "portion" may refer to any sub-set of a video frame. Further, this disclosure typically uses the term "video block" to refer to a coding node of a CU. In some specific cases, this disclosure may also use the term "video block" to refer to a treeblock, i.e., LCU, or a CU, which includes a coding node and PUs and TUs. Thus, a video block may correspond to a coding node within a CU and video blocks may have fixed or varying sizes, and may differ in size according to a specified coding standard.

A video sampling format, which may also be referred to as a chroma format, may define the number of chroma samples included in a CU with respect to the number of luma samples included in a CU. Depending on the video sampling format for the chroma components, the size, in terms of number of samples, of the U and V components may be the same as or different from the size of the Y component. In the H.264/AVC and HEVC WD5 video coding standards, a value called chroma_format_idc is defined to indicate different sampling formats of the chroma components, relative to the luma component. In HEVC WD8, chroma_format_idc is signaled using a Sequence Parameter Set (SPS). Table 1 illustrates the relationship between values of chroma_format_idc and associated chroma formats.

TABLE 1 different chroma formats defined in H.264/AVC

| chroma_format_idc | chroma format | SubWidthC | SubHeightC |
|---|---|---|---|
| 0 | monochrome | — | — |
| 1 | 4:2:0 | 2 | 2 |
| 2 | 4:2:2 | 2 | 1 |
| 3 | 4:4:4 | 1 | 1 |

In Table 1, the variables SubWidthC and SubHeightC can be used to indicate the horizontal and vertical sampling rate ratio between the number of samples for the luma component and the number of samples for each chroma component. In the chroma formats described in Table 1, the two chroma components have the same sampling rate.

In the example of Table 1, for the 4:2:0 format, the sampling rate for the luma component is twice that of the chroma components for both the horizontal and vertical directions. As a result, for a coding unit formatted according to the 4:2:0 format, the width and height of an array of samples for the luma component are twice that of each array of samples for the chroma components. Similarly, for a coding unit formatted according to the 4:2:2 format, the width of an array of samples for the luma component is twice that of the width of an array of samples for each chroma component, but the height of the array of samples for the luma component is equal to the height of an array of samples for each chroma component. For a coding unit formatted according to the 4:4:4 format, an array of samples for the luma component has the same width and height as an array of samples for each chroma component. It should be noted that in addition to the YUV color space, video data can be defined according to an RGB space color. In this manner, the chroma formats described herein may apply to either the YUV or RGB color space. RGB chroma formats are typically sampled such that the number of red samples, the number of green samples and the number of blue samples are equal. Thus, the term "4:4:4 chroma format" as used herein may refer to either a YUV color space or an RGB color space wherein the number of samples is equal for all color components.

Figure 1B:
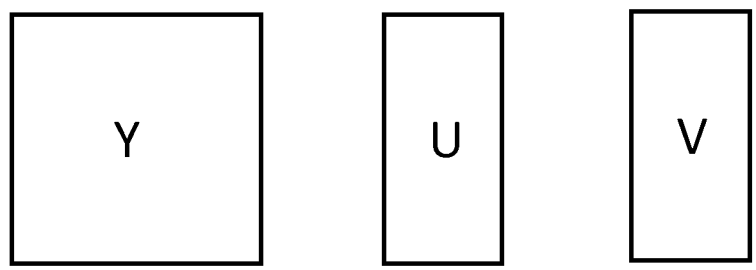
Figure 1C:
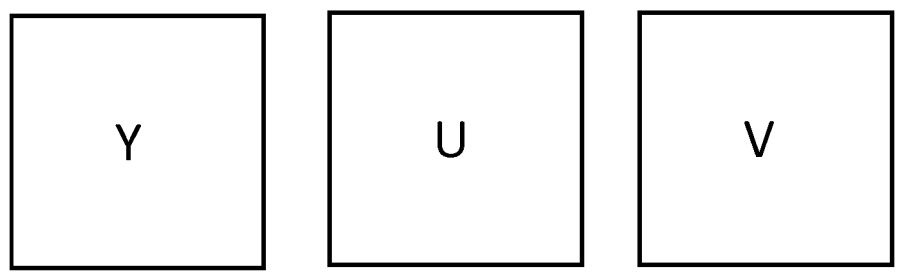

FIGS. 1A-1C are conceptual diagrams illustrating different sample formats for video data. FIG. 1A is a conceptual diagram illustrating the 4:2:0 sample format. As illustrated in FIG. 1A, for the 4:2:0 sample format, the chroma components are one quarter of the size of the luma component. Thus, for a CU formatted according to the 4:2:0 sample format, there are four luma samples for every sample of a chroma component. FIG. 1B is a conceptual diagram illustrating the 4:2:2 sample format. As illustrated in FIG. 1B, for the 4:2:2 sample format, the chroma components are one half of the size of the luma component. Thus, for a CU formatted according to the 4:2:2 sample format, there are two luma samples for every sample of a chroma component. FIG. 1C is a conceptual diagram illustrating the 4:4:4 sample format. As illustrated in FIG. 1C, for the 4:4:4 sample format, the chroma components are the same size of the luma component. Thus, for a CU formatted according to the 4:4:4 sample format, there is one luma sample for every sample of a chroma component.

Figure 2:
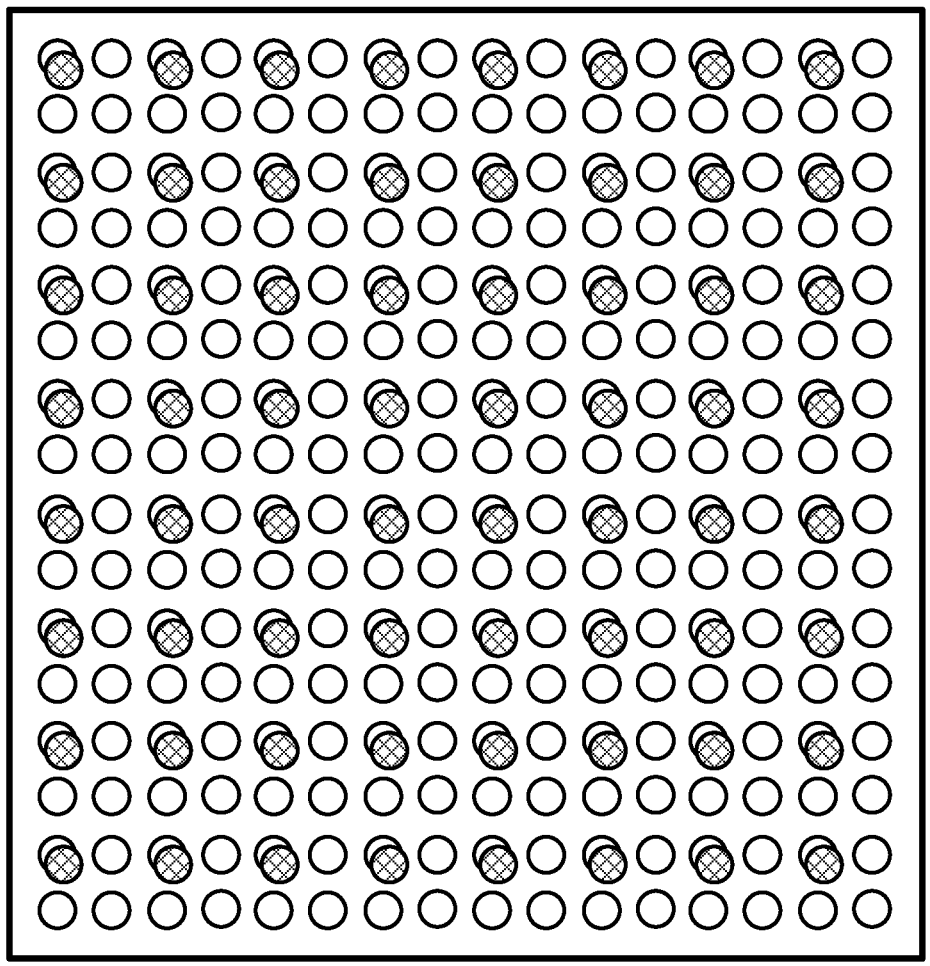
FIG. 2 is a conceptual diagram illustrating a 16×16 coding unit formatted according to a 4:2:0 sample format.
Figure 3:
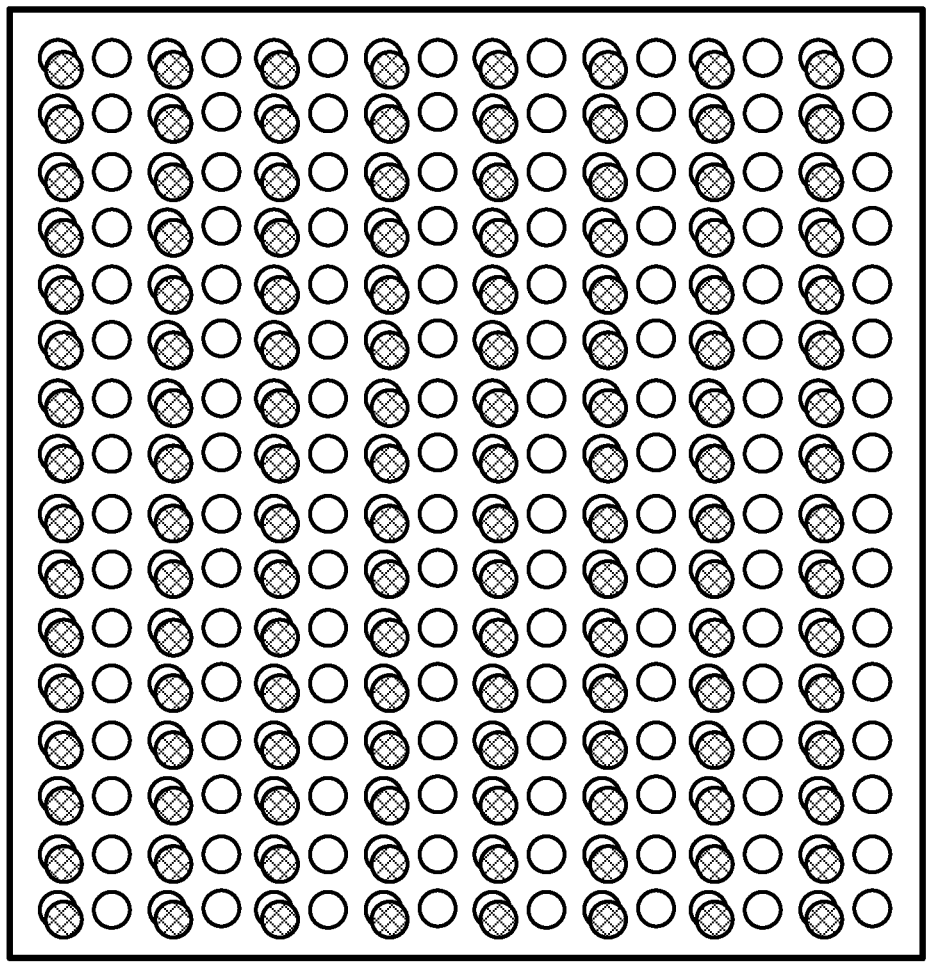
FIG. 3 is a conceptual diagram illustrating a 16×16 coding unit formatted according to a 4:2:2 sample format.

FIG. 2 is a conceptual diagram illustrating an example of a 16×16 coding unit formatted according to a 4:2:0 sample format. FIG. 2 illustrates the relative position of chroma samples with respect to luma samples within a CU. As described above, a CU is typically defined according to the number of horizontal and vertical luma samples. Thus, as illustrated in FIG. 2, a 16×16 CU formatted according to the 4:2:0 sample format includes 16×16 samples of luma components and 8×8 samples for each chroma component. Further, as described above, a CU may be partitioned into smaller CUs. For example, the CU illustrated in FIG. 2 may be partitioned into four 8×8 CUs, where each 8×8 CU includes 8×8 samples for the luma component and 4×4 samples for each chroma component FIG. 3 is a conceptual diagram illustrating an example of a 16×16 coding unit formatted according to a 4:2:2 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:2 sample format includes 16×16 samples of luma components and 8×16 samples for each chroma component. Further, as described above, a CU may be partitioned into smaller CUs. For example, the CU illustrated in FIG. 3 may be partitioned into four 8×8 CUs, where each CU includes 8×8 samples for the luma component and 4×8 samples for each chroma component.

HEVC provides for deblocking using deblocking filters to remove "blockiness" artifacts. After dividing a frame into blocks (LCUs and sub-CUs thereof), coding the blocks, and then decoding the blocks, perceptible artifacts at boundaries between the blocks may occur. Blocking artifacts typically occur at TU or PU boundaries. Deblocking or deblock filtering refers to the process of modifying the values of boundary samples of reconstructed video blocks in order to remove the appearance of blockiness artifacts for a frame. For example, boundary samples of a CU and boundary samples of an adjacent CU may be "smoothed" such that the transition from one CU to another is less apparent to a viewer.

Further, video encoders may encode video data of a frame, then subsequently decode the encoded video data, and then apply deblocking filters to the decoded video data for use as reference video data. Reference data may be data from one or more frames that a video encoder may use, for example, for inter-prediction of subsequently coded video data. A video encoder may store one or more frames within a reference picture store for inter-prediction. Such deblocking filtering performed by a video coding device, such as a video encoder or video decoder, prior to storing the decoded video data for use as reference data is generally referred to as "in-loop" filtering. In "in-loop" filtering a video encoder or decoder may perform the deblocking within a video loop. Video encoders may begin with receiving raw video data, encoding the video data, deblocking the data, and storing deblocked frames in a reference picture store.

Video decoders may be configured to decode received video data, and then apply the same deblocking filters to the decoded video data for use as reference for subsequent video data to be decoded. By configuring both encoders and decoders to apply the same deblocking techniques, the encoders and decoders can be synchronized, such that deblocking does not introduce error for subsequently coded video data using the deblocked video data for reference. Further, video decoders may be configured to deblock reconstructed video data for purposes of displaying the video data. In this case, a video decoder may perform deblocking to enhance the subjective quality of reconstructed video data. In this case, a video decoder may rely on information included in encoded video data to determine how to perform deblocking. Further, a video decoder may analyze reconstructed video data and perform deblocking according to a post processing operation. This type of deblocking may be referred to as post loop deblocking.

Deblocking may be performed on vertical boundaries, horizontal boundaries, or both vertical and horizontal boundaries. In HEVC, a determination of whether to filter to a boundary is based on the so-called boundary filtering strength variable, bS. bS is determined primarily based on the prediction mode used to reconstruct a CU. For example, when the luma component of a block neighboring a boundary is intra code, the value of bS is at least two. It should be noted that HEVC only describes deblocking for CUs formatted according to the 4:2:0 sample format and does not describe deblocking for CUs formatted according to either of the 4:2:2 or 4:4:4 sample formats.

Figure 4:
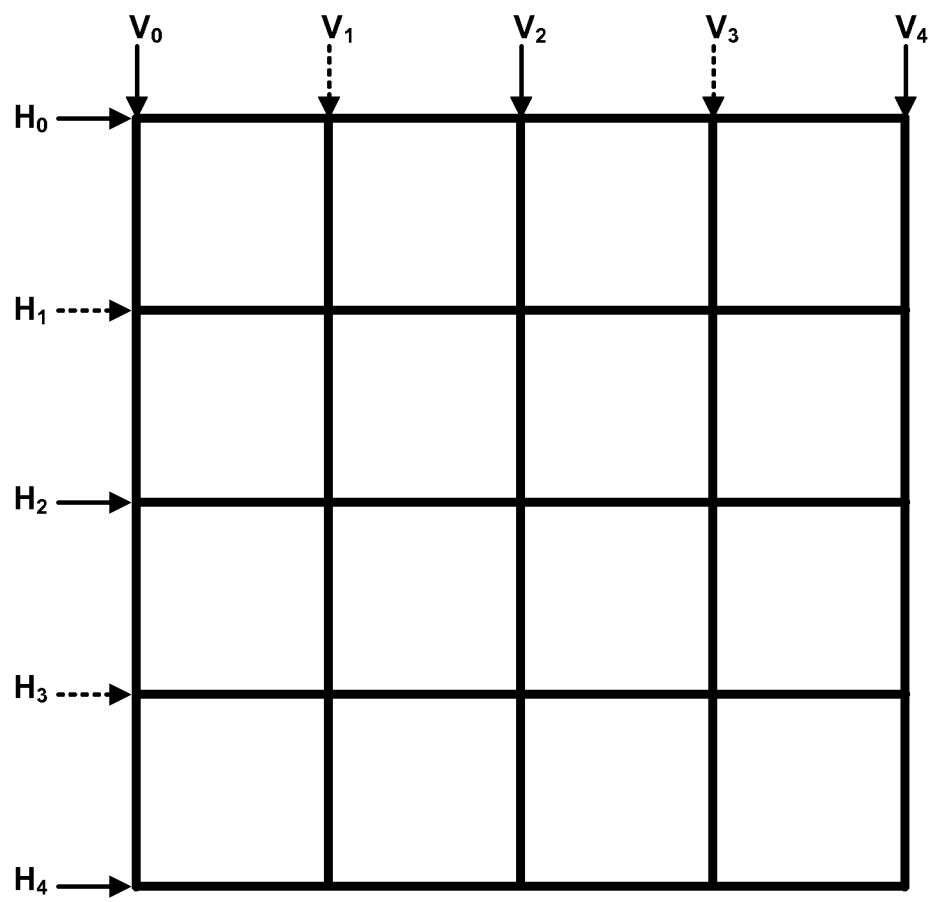
FIG. 4 is a conceptual diagram illustrating a deblocking grid.

A deblocking grid may define edges that may be deblocked. FIG. 4 is a conceptual diagram illustrating an array of sample values and possible edges that may be deblocked. The array illustrated in FIG. 4 may correspond to a combination of CUs, as described above. For example, a combination of CUs of any one of the following sizes 4×4, 8×8, 16×16, 32×32 or 64×64 formatted according any of the following chroma formats 4:2:0, 4:2:2, or 4:4:4 may form an array of N×N sample values. As illustrated in FIG. 4, five vertical edges (i.e., $V_0$-$V_4$) and five horizontal edges (i.e., $H_0$-$H_4$) are defined for the array. A deblocking grid may indicate which of the boundaries $V_0$-$V_4$ and $H_0$-$H_4$ are deblocked.

Figure 5:
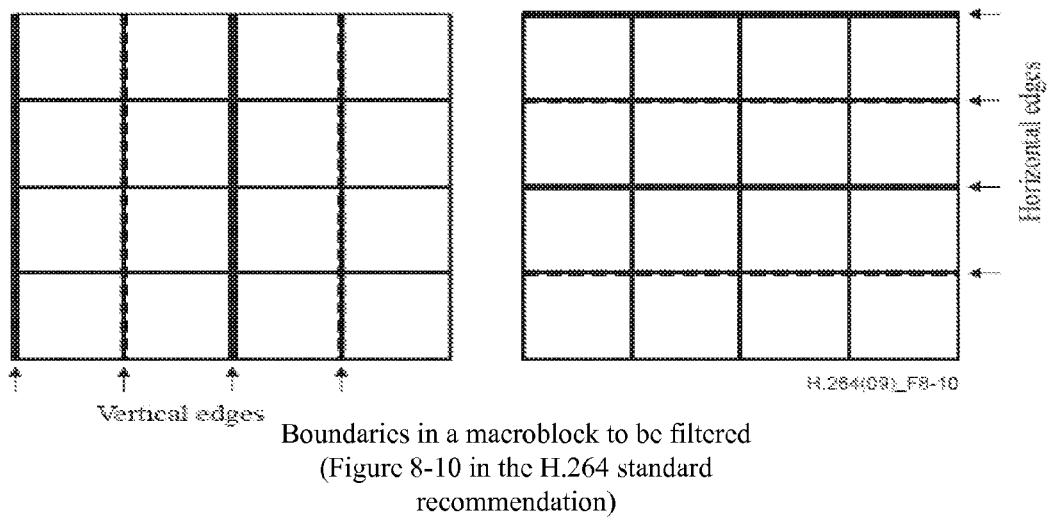
FIG. 5 is a reproduction of a figure included in the H.264 standard recommendation.
Figure 8:
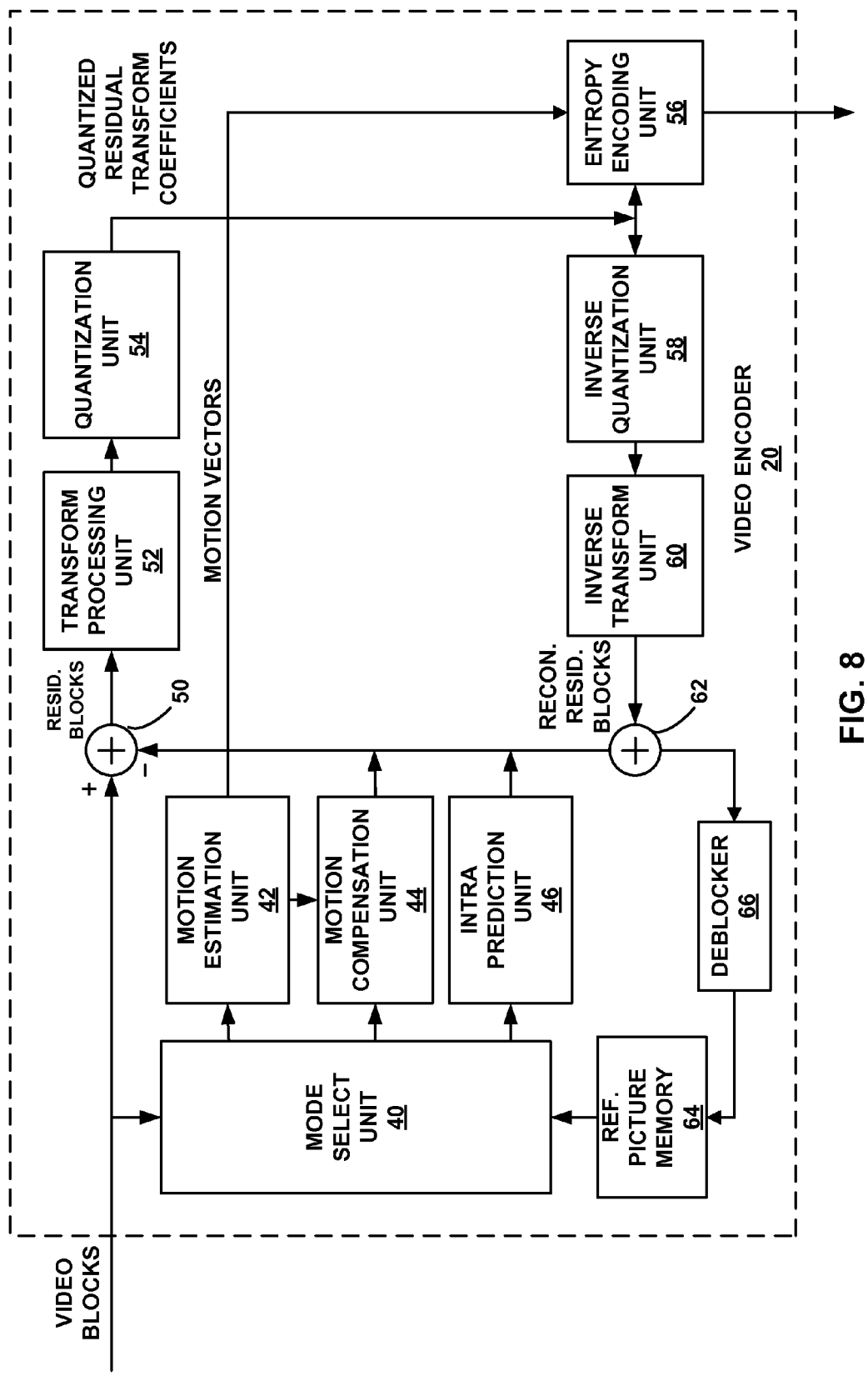
FIG. 8 is a block diagram illustrating an example video encoder that may utilize techniques for filtering a reconstructed block of video data described herein.
Figure 9:
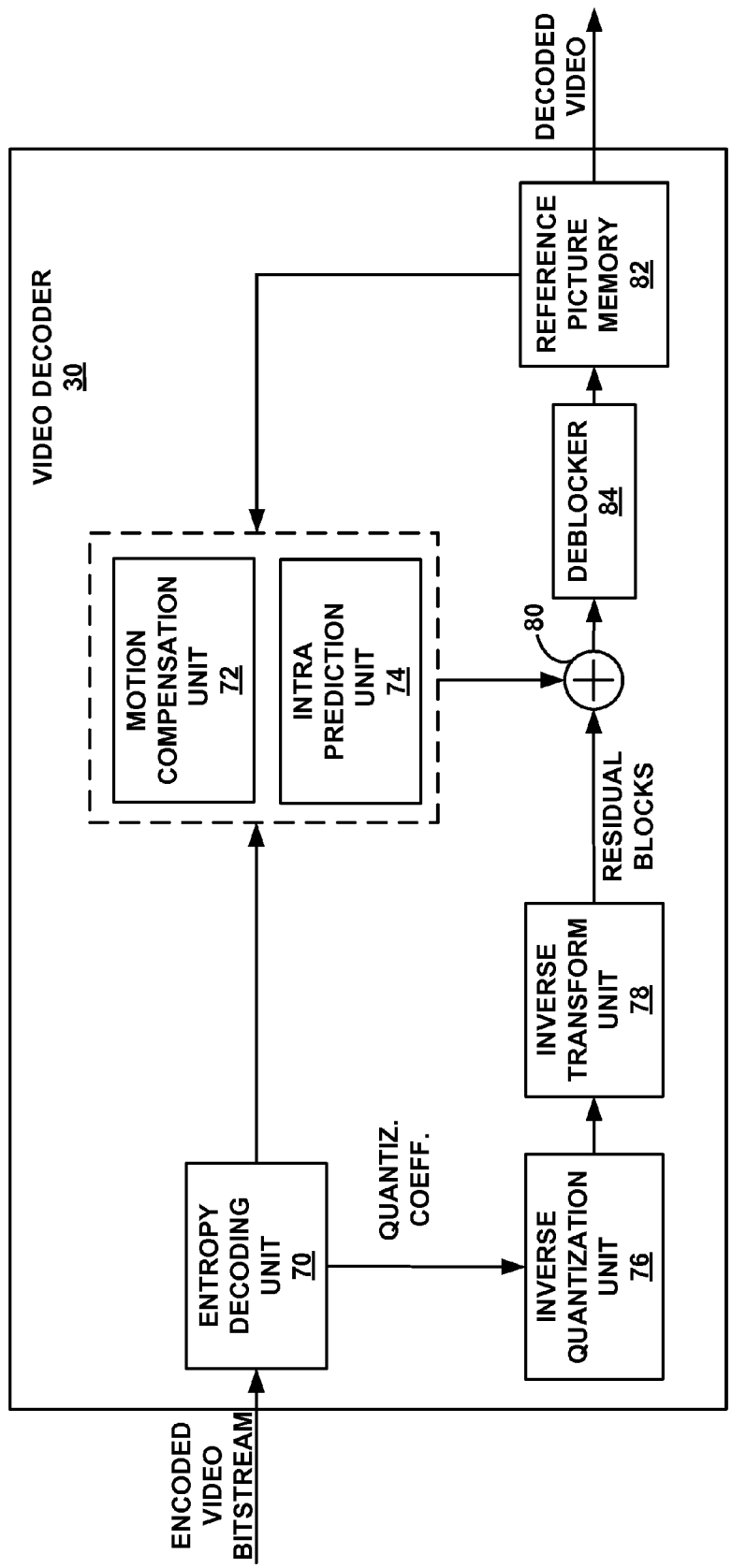
FIG. 9 is a block diagram illustrating an example video decoder that may utilize techniques for filtering a reconstructed block of video data described herein.
Figure 10:
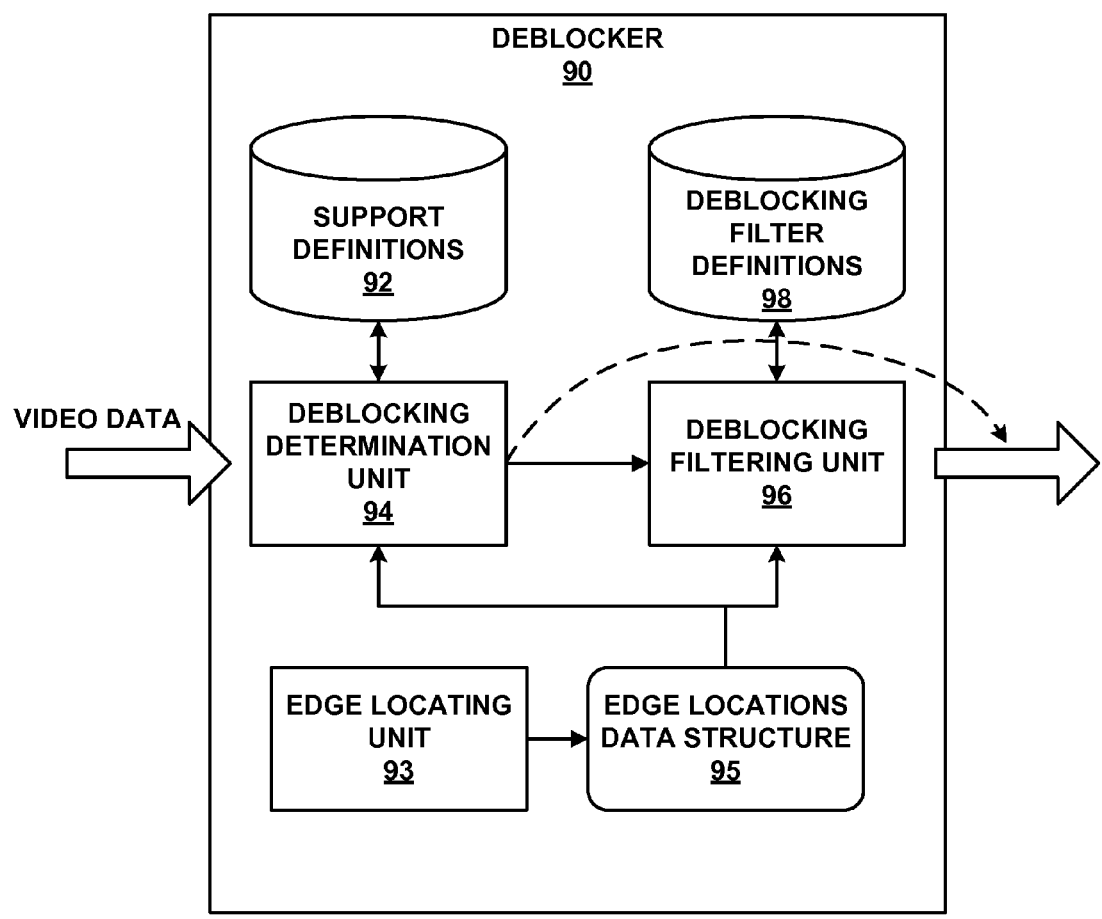
FIG. 10 is a block diagram illustrating components of an example deblocker.

FIG. 5 is a reproduction of a FIG. 8-10 included in the H.264 standard recommendation ("Recommendation ITU-T H.264: Advanced video coding for generic audiovisual services," ITU-T, March 2010), which is incorporated by reference in its entirety. FIG. 8-10 is used in the H.264 standard recommendation to indicate when boundaries of a macroblock are deblocked. As described above, a macroblock in H.264 is 16×16 pixels. Thus, each block illustrated in FIG. 8-10 includes 4×4 luma samples. The number of chroma samples in each block is one of 2×2, 2×4, or 4×4 based on whether the macroblock is formatted according to the respective 4:2:0, 4:2:2, and 4:4:4 chroma formats. The H.264 standard recommendation specifies that an in-loop deblocking filter may be applied to boundaries depending on the chroma format and transform sizes. In H.264, available transform sizes include 4×4 and 8×8. Below is the excerpt from the H.264 standard recommendation:

---

When interpreting the edges in [FIG. 5] as luma edges, depending on the transform_size_8x8_flag, the following applies.
    -If transform_size_8x8_flag is equal to 0, both types, the solid bold and dashed bold luma edges are filtered.
    -Otherwise (transform_size_8x8_flag is equal to 1), only the solid bold luma edges are filtered.
When interpreting the edges in [FIG. 5] as chroma edges, depending on ChromaArrayType, the following applies.
    -If ChromaArrayType is equal to 1 (4:2:0 format), only the solid bold chroma edges are filtered.
    -Otherwise, if ChromaArrayType is equal to 2 (4:2:2 format), the solid bold vertical chroma edges are filtered and both types, the solid bold and dashed bold horizontal chroma edges are filtered.
    -Otherwise, if ChromaArrayType is equal to 3 (4:4:4 format), the following applies.
        -If transform_size_8x8_flag is equal to 0, both types, the solid bold and dashed bold chroma edges are filtered.
        -Otherwise (transform_size_8x8_flag is equal to 1), only the solid bold chroma edges are filtered.
    -Otherwise (ChromaArrayType is equal to 0), no chroma edges are filtered.

---

Table 2 provides a summary of the deblock grid sizes used for H.264. As illustrated in Table 2, the H.264/AVC deblocking filter uses a 4×4 grid of chroma samples when processing the chroma edges for the 4:2:0 and 4:2:2 chroma formats.

TABLE 2

H.264 deblocking summary

| Chroma Format | Deblocking grid (hor × ver luma) | | Deblocking grid (hor × ver subsampled chroma) |
|---|---|---|---|
| | 4 × 4 transform | 8 × 8 transform | |
| 4:2:0 | 4 × 4 | 8 × 8 | 4 × 4 |
| 4:2:2 | 4 × 4 | 8 × 8 | 4 × 4 |
| 4:4:4 | 4 × 4 | 8 × 8 | |
| | | | 4 × 4 transform / 8 × 8 transform |
| | | | 4 × 4 / 8 × 8 |

Conversely, the HM5 in-loop deblocking filter proposed for HEVC WD5 uses a 8×8 grid of luma samples when processing luma sample and an 8×8 grid of chroma samples when processing the chroma edges for the 4:2:0 chroma format. It should be noted that the HM5 in-loop deblocking filter processes luma and chroma edges when the value of bS equals two. As described above, the deblocking of 4:2:2 and 4:4:4 chroma formats have not been adopted for HEVC by the JCT-VC.

A. Norkin, K. Andersson, R. Sjoberg, Q. Huang, J. An, X. Guo, S. Lei, "CE12: Ericsson's and Mediatek's deblocking filter," 6$^{th}$ JCT-VC Meeting, Torino, Italy, July 2011, Doc. JCTVC-F118 (hereinafter "Norkin"), which is incorporated in its entirety, proposes an extension of the HM5 deblocking filter for the 4:2:2 and 4:4:4 chroma formats. Norkin proposed using an 8×8 deblocking grid for the luma component and respective 4×4, 4×8, and 8×8 deblocking grids for the chroma samples based on whether the CU is formatted according to the respective 4:2:0, 4:2:2, and 4:4:4 chroma formats. It should be noted, that in practice the Norkin proposal would apply chroma deblocking on an equivalent 8×8 luma grid when the chroma components are upsampled to luma resolution. Table 3 summarizes the proposal of Norkin regarding chroma filtering grid.

TABLE 3

Norkin deblocking summary

| Chroma Format | Deblocking grid (hor × ver luma) | Deblocking grid (hor × ver subsampled chroma) |
|---|---|---|
| 4:2:0 | 8 × 8 | 4 × 4 |
| 4:2:2 | 8 × 8 | 4 × 8 |
| 4:4:4 | 8 × 8 | 8 × 8 |

It should be noted that the techniques described with respect to Table 3 may increase the number of chroma edges to be deblocking filtered, compared with HM5. That is, whereas the HM5 is configured to process chroma edges using an 8×8 grid in the case of the 4:2:0 format, Norkin proposes processing the chroma edges using a 4×4 grid. Therefore, the techniques described with respect to Table 3 may increase the number of chroma edges to be deblock filtered, compared with HM5. Further, in the case of the 4:2:2 chroma format, Norkin proposes an 8×8 deblocking grid for the luma component and a 4×8 deblocking grid for the chroma components. In some cases, such the filtering techniques described in Norkin may be inefficient. That is, any improvements in the perceived video quality achieved by applying the deblocking may not be justified by computational expense used to apply the number of filtering operations.

In HEVC after it is determined which boundaries are filtered, a determination is made as to which type of deblocking filter is applied to each boundary. HEVC WD8 includes two types of deblocking filters, the Normal filter (also referred to as the weak filter) and the Strong filter. One way in which the Normal and Strong filter differ is in the number of samples that may be modified on each side of a boundary. The Normal filter modifies one to two samples on each side of a boundary, whereas the Strong filter modifies up to three samples on each side of a boundary. In HEVC WD8, a determination of whether to apply the Normal or the Strong filter to a boundary is generally based bS, but the determination involves several logical operations based on other variables. For the sake of brevity, a complete discussion of the process of determining whether to apply a Normal or Strong filter in HEVC WD8 is not discussed herein. However, reference is made to the relevant portions of HEVC WD8.

FIG. 6 is a conceptual diagram illustrating a boundary between two neighboring video blocks. Although in the example illustrated in FIG. 6 side-by-side blocks are shown, it should be understood that similar deblocking techniques may be applied with respect to top-bottom neighboring blocks. FIG. 6 depicts blocks 602, 604 having edge 606. In the example illustrated in FIG. 6, blocks 602 and 604 are both square and include respect 8×8 arrays of sample values p and q. Sample values p and q may correspond to luma sample values, in which case blocks 602 and 604 may correspond to 8×8 CUs. Further, sample values p and q may correspond to chroma sample values, in which case blocks 602 and 604 may correspond to a combination of CUs of various sizes formatted according to a particular chroma format that results in 8×8 arrays of chroma samples. Table 4 provides simplified versions of the Strong and Normal filters disclosed in HEVC WD8. That is, for the sake of brevity and clarity, various clipping functions based on the quantization parameter described in HEVC WD8 have been removed from the filters in Table 4. The various clipping functions in HEVC WD8 allow for fewer than all of the sample values modified by the filters included in Table 4 to be modified.

Table 4 illustrates how respective sample values in blocks 602 and 604 are modified by either of a Strong Filter or a Normal Filter. Strong Filter in Table 4 corresponds to the defined Strong Filter in HEVC WD8 that is applied to the luma component. Normal Filter 1 in Table 4 corresponds to the defined Normal Filter in HEVC WD8 that is applied to the luma component. Normal Filter 2 in Table 4 corresponds to the defined Normal Filter in HEVC WD8 that is applied to the chroma component. As illustrated in Table 4, the Strong Filter modifies three pixel values on each side of a boundary, Normal Filter 1 modifies two sample values on each side of a boundary, and Normal Filter 2 modifies one sample values on each side of a boundary.

TABLE 4

Simplified Strong and Weak Filters in HEVC WD8

| Filter Type | Filter Definition |
| --- | --- |
| Strong Filter | $p_0' = (p_2 + 2 * p_1 + 2 * p_0 + 2 * q_0 + q_1 + 4)/8$ |
| | $p_1' = (p_2 + p_1 + p_0 + q_0 + 2)/4$ |
| | $p_2' = (2 * p_3 + 3 * p_2 + p_1 + p_0 + q_0 + 4)/8$ |
| | $q_0' = (p_1 + 2 * p_0 + 2 * q_0 + 2 * q_1 + q_2 + 4)/8$ |
| | $q_1' = (p_0 + q_0 + q_1 + q_2 + 2)/4$ |
| | $q_2' = (p_0 + q_0 + q_1 + 3 * q_2 + 2 * q_3 + 4)/8$ |

TABLE 4-continued

Simplified Strong and Weak Filters in HEVC WD8

| Filter Type | Filter Definition |
| --- | --- |
| Normal Filter 1 | $\Delta = (9 * (q0 - p0) - 3 * (q1 - p1) + 8)/16$ |
| | $p0' = p0 + \Delta$ |
| | $q0' = q0 - \Delta$ |
| | $\Delta p = (p2 + p0 + 1)/2 - p1 + \Delta)/2$ |
| | $p1' = p1 + \Delta p$ |
| | $\Delta q = (q2 + q0 + 1)/2 - q1 - \Delta)/2$ |
| | $q1' = q1 + \Delta q$ |
| Normal Filter 2 | $\Delta = ((q0 - p0)/2 + p1 - q1 + 4)/8$ |
| | $p0' = p0 + \Delta$ |
| | $q0' = q0 - \Delta$ |

Currently the HEVC WD8 main profile is restricted to the 4:2:0 chroma format. Further, the chroma deblocking filter in HEVC WD8 has lower complexity than the H.264/AVC deblocking filter, because it is restricted to intra coded block edges and to an 8×8 sample grid for subsampled chroma components. While the deblocking filters defined in HEVC WD8 may provide adequate subjective quality when applied to 4:2:0 video data, the simplified chroma deblocking filter defined in HEVC WD8 may not deliver sufficient quality for future HEVC profiles that include 4:2:2, or 4:4:4 chroma formats.

The techniques of this disclosure may provide improved deblocking of reconstructed video data formatted according to either of the 4:2:2 or 4:4:4 chroma formats. As described above, Norkin proposes using an 8×8 deblocking grid for the luma components and a 4×8 deblocking grid for the chroma components for video data formatted according to the 4:2:2 chroma format. Thus, in the case of four neighboring 8×8 blocks formatted according to the 4:2:2 chroma format, Norkin proposes deblock filtering three vertical edges and three horizontal edges for each color component, yielding 18 total filtering operations. In some cases, such filtering may be inefficient. That is, any improvements in the perceived video quality achieved by applying the deblocking may not be justified by the computational expense used to apply the number of filtering operations. Further, Norkin does not distinguish between horizontal and vertical boundaries when determining whether a type of deblocking filter is applied. Applying either a Normal or Strong filter to the horizontal edges of a video block may significantly reduce the appearance of blockiness, such that applying the same filter or any deblocking filter to the vertical edges may be inefficient. This disclosure describes techniques which may provide more efficient filtering for video data by reducing the number of filter operations compared to Norkin and determining whether to perform vertical deblocking based on horizontal deblocking.

Figure 7:
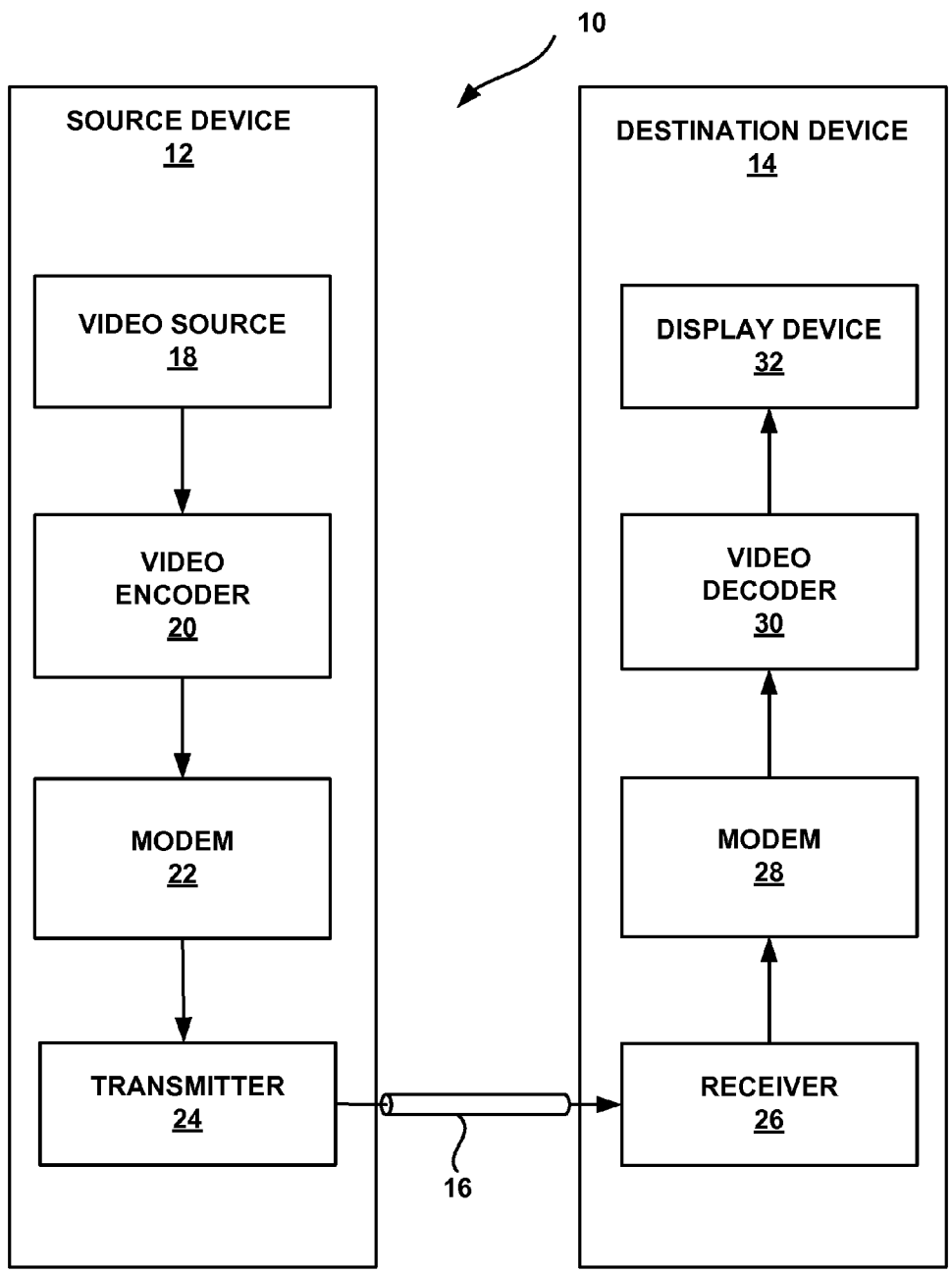
FIG. 7 is a block diagram illustrating an example video encoding and decoding system that may utilize techniques for filtering a reconstructed block of video data described herein.

FIG. 7 is a block diagram illustrating an example video encoding and decoding system 10 that may be configured to deblock an array of reconstructed video data, wherein the video data is formatted according to one of the 4:2:0, 4:2:2, or 4:4:4 chroma formats. As illustrated in FIG. 7, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless, wired, or storage media suitable for transmission or storage of encoded video data.

In the example of FIG. 7, source device 12 includes a video source 18, a video encoder 20, a modulator/demodulator (modem) 22, and a transmitter 24. Destination device 14 includes a receiver 26, a modem 28, a video decoder 30, and a display device 32. In accordance with this disclosure, video encoder 20 of source device 12 may be configured to apply the techniques for deblocking an array of reconstructed video data, wherein the video data is formatted according to one of the 4:2:0, 4:2:2, or 4:4:4 chroma formats. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 7 is merely one example. Techniques for deblocking an array of reconstructed video data, wherein the video data is formatted according to one of the 4:2:0, 4:2:2 or 4:4:4 chroma formats may be performed by any digital video encoding and/or decoding device. Although generally the techniques of this disclosure are performed by a video encoding device and/or a video decoding device, the techniques may also be performed by a video encoder/decoder, typically referred to as a "CODEC." Moreover, the techniques of this disclosure may also be performed by a video preprocessor or post processor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. The captured, pre-captured, or computer-generated video may be formatted according to any of the sample formats described above (e.g., 4:2:0, 4:2:2 or 4:4:4). As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. The information communicated over channel 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 7, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. In other examples, source device 12 may store encoded data onto a storage medium, rather than transmitting the data. Likewise, destination device 14 may be configured to retrieve encoded data from a storage medium.

Video encoder 20 and video decoder 30 may generally operate according to a video compression standard, such as the ITU-T H.264 standard, alternatively referred to as MPEG-4, Part 10, Advanced Video Coding (AVC). Further, video encoder 20 and video decoder 30 may generally operate according to the upcoming HEVC standard. The techniques of this disclosure, however, are not limited to any particular coding standard. Although not shown in FIG. 7, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP). In some aspects, the techniques described in this disclosure may be applied to devices that generally conform to the H.264 standard or HEVC standard.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device. An apparatus including video encoder 20 and/or video decoder 30 may include a cellular telephone, a camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Each video frame may include a plurality of slices. Each slice may include a plurality of video blocks, which may be arranged into partitions, also referred to as sub-blocks. The video blocks may have fixed or varying sizes, and may differ in size according to a specified coding standard. As described above, video blocks may include variable sized CUs described in HEVC WD5. Further, a video block may correspond to a macroblock or a partition of a macroblock. Video encoder 20 typically operates on video blocks within individual video frames in order to encode the video data.

As described above, video blocks may comprise arrays of pixel data in the pixel domain. Video blocks may also comprise arrays of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

As described above, following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m. In some cases, quantization may result in low value transform coefficients being represented as zero. In addition to the selection of TU sizes, perceivable blockiness in a reconstructed image may also be based on the quantization process perform on transform coefficients. In general, a lower the value of m results in more perceivable blockiness.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

FIG. 8 is a block diagram illustrating an example of video encoder 20 that may implement techniques for filtering reconstructed video data. Video encoder 20 may perform intra- and inter-coding of blocks within video frames, including blocks, or partitions or sub-partitions of blocks. As described above, intra-coding relies on spatial prediction to reduce or remove spatial redundancy in video within a given video frame and inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes.

As shown in FIG. 8, video encoder 20 receives a current video block within a video frame to be encoded. The current video block may be formatted according to any the 4:2:0, 4:2:2, or 4:4:4 chroma formats. In the example of FIG. 8, video encoder 20 includes mode select unit 40, motion estimation unit 42, motion compensation unit 44, intra-prediction unit 46, reference picture memory 64, summer 50, transform unit 52, quantization unit 54, and entropy encoding unit 56. For video block reconstruction, video encoder 20 also includes inverse quantization unit 58, inverse transform unit 60, and summer 62, reference picture memory 64, and deblocker 66. In accordance with the techniques of this disclosure, video encoder 20 includes deblocker 66 that selectively filters the output of summer 62. Deblocker 66 may perform deblocking according to the techniques described herein.

During the encoding process, video encoder 20 receives a video frame or slice to be coded. The frame or slice may be divided into multiple video blocks. Motion estimation unit 42 and motion compensation unit 44 may perform inter-predictive coding of the received video block relative to one or more blocks in one or more reference frames. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data. Mode select unit 40 may select one of the coding modes, intra or inter, e.g., based on error results or a predefined coding structure, and provides the resulting intra- or inter-coded block to summer 50 to generate residual block data and to summer 62 to reconstruct the encoded block for use as a reference frame.

Motion estimation unit 42 and motion compensation unit 44 may be highly integrated and operate according to any of the video coding standards described above. Motion estimation unit 42 and motion compensation unit 44 are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference picture memory 64. Reference frames stored in reference picture memory 64 may be organized according to a list defined according to a video coding standard. Motion compensation unit 44 may also interpolate sub-integer pixels of a reference frame. Motion estimation unit 42 compares blocks of one or more reference frames from reference picture memory 64 to a block to be encoded of a current frame. When the reference frames in reference picture memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference picture memory 64 if no values for sub-integer pixel positions are stored in reference picture memory 64. Motion estimation unit 42 sends the calculated motion vector to entropy encoding unit 56 and motion compensation unit 44. The reference frame block identified by a motion vector may be referred to as a predictive block. Motion compensation unit 44 may calculate prediction data based on the predictive block.

Intra-prediction unit 46 may intra-predict a current block, as an alternative to the inter-prediction performed by motion estimation unit 42 and motion compensation unit 44. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes, e.g., based on a rate-distortion analysis. According to HEVC WD5, possible intra-prediction modes may include planar prediction modes, a DC prediction, and angular prediction modes.

Further, in one example, motion estimation unit 42 and/or intra prediction unit 46 may calculate rate-distortion values using a rate-distortion analysis for the various tested prediction modes, and select the prediction mode having the best rate-distortion characteristics among the tested modes. Video encoder 20 forms a residual video block by subtracting the predictive video block from the original video block being encoded. Summer 50 represents the component or components that perform this subtraction operation.

Transform unit 52 applies a transform, such as a discrete cosine transform (DCT) or a conceptually similar transform, to the residual block, producing a video block comprising residual transform coefficient values. Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter. Thus, perceived "blockiness" or reconstructed video data may be based on a quantization parameter.

Following quantization, entropy encoding unit 56 entropy codes the quantized transform coefficients. For example, entropy encoding unit 56 may perform content adaptive variable length coding (CAVLC), context adaptive binary arithmetic coding (CABAC), or another entropy coding technique. In the case of context adaptive binary arithmetic coding, context may be based on neighboring video blocks. Following the entropy coding by entropy encoding unit 56, the encoded video may be transmitted to another device or archived for later transmission or retrieval.

In some cases, entropy encoding unit 56 or another unit of video encoder 20 may be configured to perform other coding functions, in addition to entropy coding. For example, entropy encoding unit 56 may be configured to determine the CBP values for the blocks and partitions. Also, in some cases, entropy encoding unit 56 may perform run length coding of the coefficients in a video block. Further, entropy encoding unit 56 may apply a zig-zag scan or other scan pattern to scan the transform coefficients in a video block. Entropy encoding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. For example, motion compensation unit 44 may calculate a reference block by adding the reconstructed residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to a reference block to produce a reconstructed video block for storage in reference picture memory 64. The stored reconstructed video block may be used by motion estimation unit 42 and motion compensation unit 44 as a reference block to inter-code a block in a subsequent video frame. A described above, in-loop deblocking may be performed by a video encoder, such as video encoder 20. Deblocker 66 may deblock luma and chroma edges according to any of the deblocking techniques described herein. Examples of deblocking techniques that may be performed by deblocker 66 are described in detail with respect to FIG. 10.

FIG. 9 is a block diagram illustrating an example of video decoder 30 that may implement techniques for filtering reconstructed video data. In the example of FIG. 9, video decoder 30 includes an entropy decoding unit 70, motion compensation unit 72, intra prediction unit 74, inverse quantization unit 76, inverse transformation unit 78, summer 80, reference picture memory 82 and deblocker 84. Video decoder 30 may, in some examples, perform a decoding pass generally reciprocal to the encoding pass described with respect to video encoder 20 (FIG. 8).

Motion compensation unit 72 may generate prediction data based on motion vectors received from entropy decoding unit 70. Motion compensation unit 72 may use motion vectors received in the bitstream to identify a prediction block in reference frames in reference picture memory 82. Intra prediction unit 74 may use intra prediction modes received in the bitstream to form a prediction block from spatially adjacent blocks. Inverse quantization unit 76 inverse quantizes (i.e., dequantizes) the quantized block coefficients provided in the bitstream and decoded by entropy decoding unit 70. The inverse quantization process may include a conventional process, e.g., as defined by the H.264 decoding standard of HEVC WD5.

Inverse transform unit 78 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of blocks used to encode frame(s) of the encoded video sequence, partition information that describes how each video block of a frame of the encoded video sequence is partitioned, modes indicating how each partition is encoded, one or more reference frames (and reference frame lists) for each inter-encoded video block or partition, and other information to decode the encoded video sequence.

Summer 80 sums the residual blocks with the corresponding prediction blocks generated by motion compensation unit 72 or intra-prediction unit to form reconstructed video blocks. The reconstructed video blocks are then stored in reference picture memory 82, which provides reference blocks for subsequent motion compensation and also produces decoded video for presentation on a display device (such as display device 32 of FIG. 7). A described above, in-loop or post-loop deblocking may be performed by a video decoder, such as video decoder 30. Deblocker 84 may deblock luma and chroma edges according to any of the deblocking techniques described herein. Deblocker 84 may deblock edges according to any of the deblocking techniques performed by deblocker 66 as part of an in-loop deblocking process. Alternatively, deblocker 84 may deblock edges as part of a post loop deblocking process, even if deblocking techniques are not performed by deblocker 66. Further it should be noted that in some cases video decoder 30 reconstruct video data formatted according to the 4:2:0 chroma format and perform an upconversion operation on the video data to generate video data formatted according to a 4:2:2 or 4:4:4 chroma format.

FIG. 10 is a block diagram illustrating components of an example deblocker 90. In general, either or both of deblocker 66 (FIG. 8) and deblocker 84 (FIG. 9) may include components substantially similar to those of deblocker 90. Other video coding devices, such as video encoders, video decoders, video encoder/decoders (CODECs), video postprocessors, and the like may also include components substantially similar to deblocker 90. Deblocker 90 may be implemented in hardware, software, or firmware. When implemented in software or firmware, corresponding hardware (such as one or more processors or processing units and memory for storing instructions for the software or firmware) may also be provided.

In the example of FIG. 10, deblocker 90 includes a memory storing support definitions 92, edge locating unit 93, deblocking determination unit 94, a memory storing data according to an edge locations data structure 95, deblocking filtering unit 96, and a memory storing deblocking filter definitions 98. Any or all of the components of deblocker 90 may be functionally integrated. The components of deblocker 90 are illustrated separately for purposes of illustration. In general, deblocker 90 receives sample values of reconstructed video blocks, e.g., from a summation component that combines prediction data with residual data for the blocks. For example, deblocker 90 may receive a video block formatted according to one of the 4:2:0, 4:2:2 or 4:4:4 chroma formats. In which case, deblocker 90 receives an array of luma sample values and corresponding arrays of chroma sample values. Deblocker 90 may further receive data indicating how the blocks were predicted, i.e., intra-mode or intra-mode. In the example described below, deblocker 90 is configured to receive data including a reconstructed sample values for an LCU, a CU quadtree for the LCU, where the CU quadtree describes how the LCU is partitioned into CUs, information that indicates prediction modes for leaf-node CUs, and information that indicates the TU structure for the CUs.

Deblocker 90 may maintain edge locations data structure 95 in a memory of deblocker 90, or in an external memory provided by a corresponding video coding device. As described above, deblocking may be performed according to defined deblocking grids. Edge locations data structure 95 may include one or more deblocking grids that may be used for deblocking video data. For example, edge locations data structure 95 may store the deblocking grids corresponding to Tables 2 and 3 described above. In one example, edge locations data structure 95 may include a deblocking grid corresponding to Table 5 below and deblocker 90 may be configured to deblock video data according to the deblocking grids illustrated in Table 5.

TABLE 5

Deblocking summary

| Chroma Format | Deblocking grid (hor × ver luma) | Deblocking grid (hor × ver subsampled chroma) |
|---|---|---|
| 4:2:0 | 8 × 8 | 8 × 8 |
| 4:2:2 | 8 × 8 | 8 × 16 |
| 4:4:4 | 8 × 8 | 16 × 16 |

As described above, Norkin proposes using an 8×8 deblocking grid for the luma components and a 4×8 deblocking grid for the chroma components for video data formatted according to the 4:2:2 chroma format. In contrast to Norkin, as illustrated in Table 5, for video data formatted according to the 4:2:2 sample format, a 8×8 deblocking grid may be used for the luma component and an 8×16 deblocking grid may be used for the chroma components. Thus, compared to Norkin the deblocking grid in Table 5 would reduce the total number of filtering operations performed by deblocker 90. In some cases, the total number of deblocking operations performed could be reduced by at least 25%. Such a reduction may significantly reduce the number of computations for deblocking 1920×1080 resolution video data, well providing adequate subjective quality. It should be noted that in addition to providing chroma deblocking grids that preserve the 16×16 equivalent grid at luma resolution, the deblocking grids in Table 5 also preserve the direct mapping relationship (four parts per chroma edge) from HM5 between luma and chroma boundary strengths per part.

In addition to applying any and all combinations of the deblocking grids described above deblocker 90 may be configured such the deblocking grid resolution may be any and all combinations of 4×4, 8×8, or 16×16 samples for any of the components when a video block is formatted using a 4:4:4 chroma format. In one example, deblocker 90 may be configured to apply the luma component deblocking filter method described in the main profile of HEVC WD8 to 4:4:4 chroma components. Further, deblocker 90 may be configured to use a deblocking grid of 4×4, 4×8, 8×8, 8×16 or 16×16 for samples for chroma components when video data is formatted according to a 4:2:2 format.

As described above, the syntax element chroma_format_idc may indicate a chroma format. Deblocker 90 may be configured to receive chroma_format_idc, or data representative of the chroma format for current video data, and determine a deblocking grid size based on the value of chroma_format_idc. In this manner, deblocker 90 may be configured to determine whether a video block is formatted according to one of 4:2:0, 4:2:2, or 4:4:4 chroma formats, deblock chroma edges using an 8×8 deblocking grid if the video block is formatted according to a 4:2:0 chroma format, deblock chroma edges using an 8×16 deblocking grid if the video block is formatted according to a 4:2:2 chroma format, and deblock chroma edges using an 16×16 deblocking grid when the video block is formatted according to a 4:4:4 chroma format.

As described above, an LCU may be partitioned into variable sized CUs and CUs may include PUs and CUs. Thus, an edge defined according to a deblocking grid may or may not correspond to an actual partition boundary. Edge locating unit 93 may determine whether an edge defined according to a deblocking grid corresponds with a CU, PU, or TU boundary. In some examples, edge locating unit 93 may receive a CU quadtree corresponding to an LCU that indicates how the LCU is partitioned into CUs. Edge locating unit 93 may analyze the CU quadtree to determine boundaries between CUs in the LCU that are candidates for deblocking based on a defined deblocking grid.

In general, deblocking determination unit 94 may be configured with one or more deblocking determination functions. As described above, HEVC includes the so-called boundary filtering strength variable, bS. In one example, deblocking determination unit 94 may be configured with functions that determine bS based on the values of reconstructed samples and data associated with reconstructed video data. Support definitions 92 may include definitions to determine variables (i.e., supports), such as bS. Deblocking determination unit 94 may be configured to apply one or more deblocking determination functions to one or more sets of support to determine whether a particular edge between two blocks of video data should be deblocked. In some examples, however, deblocking determination unit 94 is configured to skip application of the deblocking determination functions to a particular edge. The dashed line originating from deblocking determination unit 94 represents data for blocks being output without being filtered. In cases where deblocking determination unit 94 determines that a boundary between two blocks should not be filtered, deblocker 90 may output the data for the blocks without altering the data. That is, the data may bypass deblocking filtering unit 96, such that the data is not deblock filtered. On the other hand, when deblocking determination unit 94 determines that an edge should be deblocked, deblocking determination unit 94 may cause deblocking filtering unit 96 to filter values for pixels near the edge, to deblock the edge.

As described above with respect to Table 4, HEVC includes Normal and Strong filters. Deblocking filter definitions 98 may store definitions of deblocking filters, such as the Normal and Strong filters defined according to HEVC WD8. Deblocking filtering unit 96 retrieves definitions of deblocking filters from deblocking filter definitions 98 for edges to be deblocked, as indicated by deblocking determination unit 94. Further as described above, applying either a Normal or Strong a filter to the horizontal edges of a video block may significantly reduce the appearance of blockiness, such that applying the same filter to the vertical edge may be inefficient. Deblocker 90 may be configured such that if a Normal or Strong filter is applied to a horizontal edge, a filter of reduced width or no filter is applied to a vertical edge. Further, in some cases the filter applied to chroma components may be based on the filter applied to luma components.

In case of the 4:4:4 chroma format, because chroma components are not subsampled, in some examples, the filtering of the chroma components may be based on the filtering on luma components. In one example, deblocker may be configured such that deblocking conditions (e.g., on/off, Normal/Strong, etc.) may be computed based on a single color component, for example luma, and shared with the other components when video data is formatted according to a 4:4:4 chroma format. In one example, deblocker 90 may be configured such that only the Normal luma deblocking filter and associated deblocking conditions may be applied to the 4:4:4 chroma components. In another example, only the Strong luma deblocking filter and associated deblocking conditions may be applied to the 4:4:4 chroma components. As an alternative, deblocker 90 may be configured such that the deblocking conditions may be computed independently for each component when video data is formatted according to a 4:4:4 chroma format.

In case of the 4:2:2 chroma format, deblocker 90 may be configured to modify the Normal or Strong filter when either is applied to vertical boundaries. In one example, the filter width may be reduced when filtering vertical edges. In one example, the Normal filter width may be reduced to modify up to one sample on each side of the vertical edge. In another example, Strong filter width may be reduced to modify up to two or one samples on each side of the vertical edge. In another example, the Strong or Normal filter may be disabled for the vertical edges. Deblocker 90 may be configured to reduce the number of samples modified on each side of a vertical boundary based on the filter applied to the horizontal edges of a chroma component. For example, if the Strong filter is applied to the horizontal edges of a chroma component, filtering may be disabled for the vertical edges. In another example, the number of columns of samples modified may be reduced by one or two columns if a horizontal edge is filtered.

Figure 11:
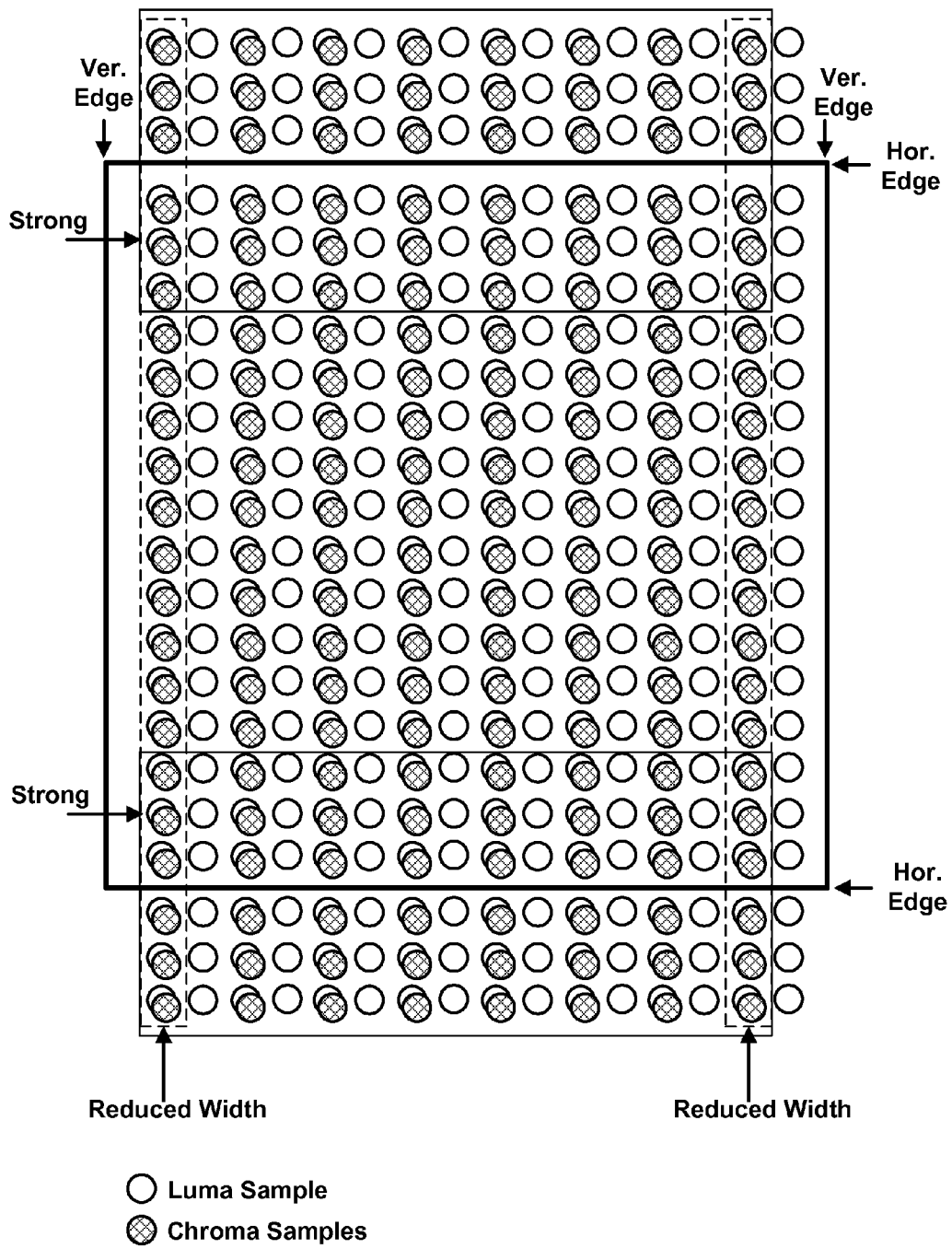
FIG. 11 is a conceptual diagram illustrating filtering a reconstructed block of video data according to the techniques described herein.

FIG. 11 is a conceptual diagram illustrating filtering a reconstructed block of video data according to the techniques described herein. FIG. 11 illustrates a 16×16 array of luma samples with corresponding chroma samples formatted according to the 4:2:2 chroma format. The array in FIG. 11 may be formed by combining any combination of different sized CUs described above. As illustrated in FIG. 11 two horizontal chroma edges are defined, where the edges are separated by sixteen chroma sample values. Further, two vertical edges are defined. In this case, vertical edges are separated by eight chroma sample values. FIG. 11 illustrates where a Strong Filter is applied to the rows of chroma samples corresponding to the horizontal edges. As illustrated in FIG. 11, that sample values in a neighboring array associated with the top and bottom horizontal edges may are also filtered. The Strong filter may be a Strong filter defined according to HEVC WD8. Further, FIG. 11 illustrates where a reduced width filter is applied to the columns of chroma samples corresponding to the vertical edges. It should be noted, that sample values in a neighboring array (not shown) associated with the vertical edge are also filtered. In the example illustrated in FIG. 11 the reduced width filter may be the Strong filter applied only to two columns (i.e., $p_0$ and $q_0$). Deblocker 90 may be configured to filter an array of sample values according to the conceptual diagram illustrated in FIG. 11.

Figure 12:
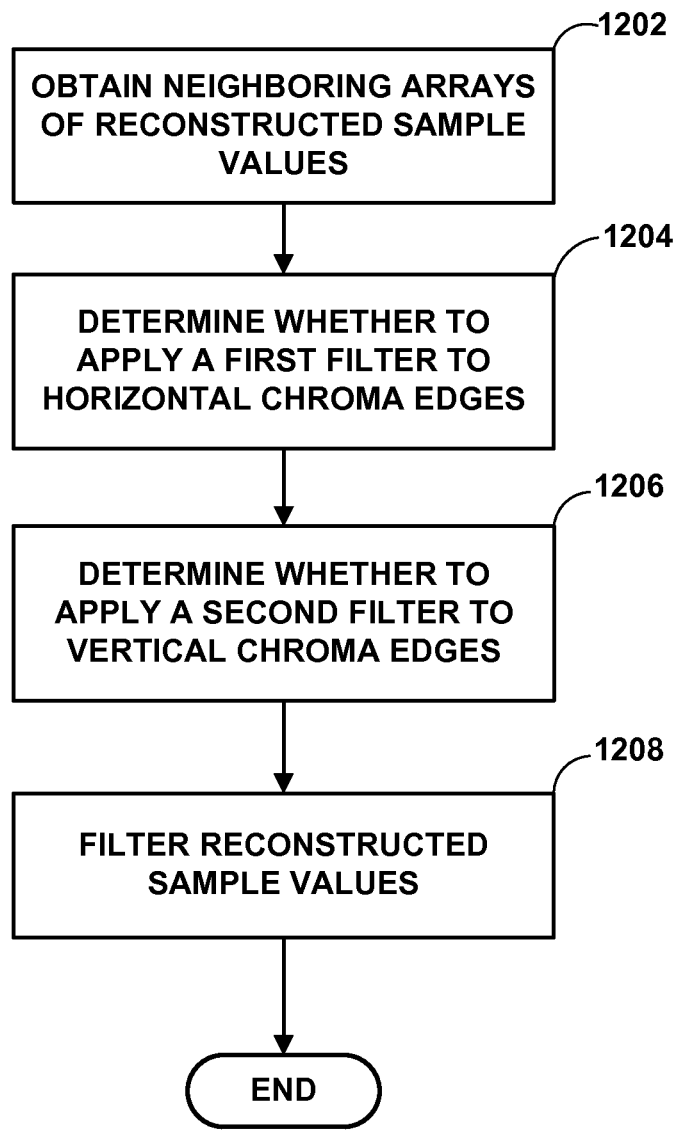
FIG. 12 is a flowchart illustrating a technique for filtering a reconstructed block of video data described herein.

FIG. 12 is a flowchart illustrating a technique for filtering a reconstructed block of video data. The technique illustrated in FIG. 12 is described as being performed by deblocker 90, but may be performed by any of video encoder 20, video decoder 30, deblocker 66, or deblocker 84. Deblocker 90 obtains an array of reconstructed sample values (1202). The array of reconstructed sample values may be formatted according to any of the 4:2:0, 4:2:2, 4:4:4 chroma formats. The array may be obtained by combining a plurality of various sized CUs, e.g., after decoding the CUs. Deblocker 90 determines whether to apply a first filter to horizontal chroma edges (1204). The first filter may be any of the filters described herein, (e.g., Strong, Normal, the HEVC chroma filter or reduced width versions thereof). The horizontal chroma edges may be separated by any number of chroma sample values (e.g., 4, 8, or 16). Deblocker 90 determines whether to apply a second filter to vertical chroma edges (1204). The second filter may be any of the filters described herein, (e.g., Strong, Normal, or reduced width versions thereof). The vertical chroma edges may be separated by any number of chroma sample values (e.g., 4, 8, or 16). The determination whether to apply a second filter to vertical chroma edges may be based on the determination whether to apply the first filter. For example, after determining to apply the first filter, deblocker 90 may determine not to apply the second filter. Deblocker 90 filters reconstructed sample values (1208). The filtered reconstructed values may be used as reference values (e.g., stored in a reference picture memory, such as reference picture memory 64 or reference picture memory 82) and/or output to a display.

In this manner, deblocker 90, video encoder 20, and video decoder 30 represent examples of video coding devices configured to obtain an array of sample values, wherein the array is formatted according to a 4:2:2 chroma format, determine whether to apply a first filter to rows of chroma sample values associated with defined horizontal edges within the array, wherein the defined horizontal edges are separated by sixteen chroma sample values and determine whether to apply a second filter to columns of chroma sample values associated with defined vertical edges within the array, wherein the defined vertical edges are separated by eight chroma sample values.

In general, the techniques of this disclosure may be performed by a video encoder and a video decoder. In one or more examples, the functions described may be implemented in hardware, software, firmware, or any combination thereof. If implemented in software, the functions may be stored on or transmitted over as one or more instructions or code on a computer-readable medium and executed by a hardware-based processing unit. The hardware-based processing unit may be included in a mobile device, such as a cellular telephone, a smart-phone, a laptop computer, a tablet computer, a personal digital assistant (PDA), a mobile video display device, or other such mobile devices. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

It is to be recognized that depending on the implementation, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

What is claimed is:

1. A method for filtering reconstructed video data, the method comprising:
obtaining an array of sample values, wherein the array is formatted according to a 4:2:2 chroma format;
determining whether to apply a first filter to rows of chroma sample values associated with defined horizontal edges within the array, wherein the defined horizontal edges are separated by sixteen chroma sample values, without determining whether to apply the first filter to any horizontal edges other than the defined horizontal edges of the array;

determining whether to apply a second filter, different from the first filter, to columns of chroma sample values associated with the defined vertical edges within the array, wherein the defined vertical edges are separated by eight chroma sample values, without determining whether to apply the second filter to any vertical edges other than the defined horizontal edges of the array, wherein the second filter has a filter width that is smaller than a filter width of the first filter;

applying the first filter to one or more of the rows in response to determining to apply the first filter to the one or more rows, without applying the second filter to any of the rows; and applying the second filter to one or more of the columns in response to determining to apply the second filter to the one or more columns, without applying the first filter to any of the columns.

2. The method of claim 1, wherein determining whether to apply the second filter is based at least in part on the determination of whether to apply the first filter.

3. The method of claim 2, wherein the first filter modifies up to six rows of chroma sample values associated with a defined horizontal edge and wherein the second filter is not applied if the first filter is applied.

4. The method of claim 1, wherein the first filter modifies up to six rows of chroma sample values associated with a defined horizontal edge and wherein the second filter modifies up to four columns of chroma sample values associated with a defined vertical edge.

5. The method of claim 1, wherein the first filter modifies up to six rows of chroma sample values associated with a defined horizontal edge and wherein the second filter modifies up to two columns of chroma sample values associated with a defined vertical edge.

6. The method of claim 1, wherein the first filter modifies up to four rows of chroma sample values associated with a defined horizontal edge and wherein the second filter modifies up to two columns of chroma sample values associated with a defined vertical edge.

7. The method of claim 1, wherein obtaining an array of sample values includes summing residual blocks of video data and corresponding prediction blocks of video data.

8. An apparatus for filtering reconstructed video data, the apparatus comprising:

a memory configured to store video data; and a video coding device configured to:

obtain an array of sample values of the video data, wherein the array is formatted according to a 4:2:2 chroma format;

determine whether to apply a first filter to rows of chroma sample values associated with defined horizontal edges within the array, wherein the defined horizontal edges are separated by sixteen chroma sample values, without determining whether to apply the first filter to any horizontal edges other than the defined horizontal edges of the array;

determine whether to apply a second filter, different from the first filter, to columns of chroma sample values associated with defined vertical edges within the array, wherein the defined vertical edges are separated by eight chroma sample values, without determining whether to apply the second filter to any vertical edges other than the defined horizontal edges of the array, wherein the second filter has a filter width that is smaller than a filter width of the first filter;

apply the first filter to one or more of the rows in response to determining to apply the first filter to the one or more rows, without applying the second filter to any of the rows; and apply the second filter to one or more of the columns in response to determining to apply the second filter to the one or more columns, without applying the first filter to any of the columns.

9. The apparatus of claim 8, wherein determining whether to apply the second filter is based at least in part on the determination of whether to apply the first filter.

10. The apparatus of claim 9, wherein the first filter modifies up to six rows of chroma sample values associated with a defined horizontal edge and wherein the second filter is not applied if the first filter is applied.

11. The apparatus of claim 8, wherein the first filter modifies up to six rows of chroma sample values associated with a defined horizontal edge and wherein the second filter modifies up to four columns of chroma sample values associated with a defined vertical edge.

12. The apparatus of claim 8, wherein the first filter modifies up to six rows of chroma sample values associated with a defined horizontal edge and wherein the second filter modifies up to two columns of chroma sample values associated with a defined vertical edge.

13. The apparatus of claim 8, wherein the first filter modifies up to four rows of chroma sample values associated with a defined horizontal edge and wherein the second filter modifies up to two columns of chroma sample values associated with a defined vertical edge.

14. The apparatus of claim 8, wherein obtaining an array of sample values includes summing residual blocks of video data and corresponding prediction blocks of video data.

15. The apparatus of claim 8, wherein the video coding device is a video decoding device and further comprises at least one of:

an integrated circuit; or a microprocessor.

16. The apparatus of claim 8, wherein the video coding device is a video encoding device and further comprises at least one of:

an integrated circuit; or a microprocessor.

17. A non-transitory computer program product comprising a computer-readable storage medium having instructions stored thereon that, when executed, cause one or more processors of a device for filtering reconstructed video data to:

obtain an array of sample values, wherein the array is formatted according to a 4:2:2 chroma format;

determine whether to apply a first filter to rows of chroma sample values associated with defined horizontal edges within the array, wherein the defined horizontal edges are separated by sixteen chroma sample values, without determining whether to apply the first filter to any horizontal edges other than the defined horizontal edges of the array;

determine whether to apply a second filter, different from the first filter, to columns of chroma sample values associated with defined vertical edges within the array, wherein the defined vertical edges are separated by eight chroma sample values, without determining whether to apply the second filter to any vertical edges other than the defined horizontal edges of the array, wherein the second filter has a filter width that is smaller than a filter width of the first filter;

apply the first filter to one or more of the rows in response to determining to apply the first filter to the one or more rows, without applying the second filter to any of the rows; and apply the second filter to one or more of the columns in response to determining to apply the second filter to the one or more columns, without applying the first filter to any of the columns.

18. The non-transitory computer program product of claim 17, wherein determining whether to apply the second filter is based at least in part on the determination of whether to apply the first filter.

19. The non-transitory computer program product of claim 18, wherein the first filter modifies up to six rows of chroma sample values associated with a defined horizontal edge and wherein the second filter is not applied if the first filter is applied.

20. The non-transitory computer program product of claim 17, wherein the first filter modifies up to six rows of chroma sample values associated with a defined horizontal edge and wherein the second filter modifies up to four columns of chroma sample values associated with a defined vertical edge.

21. The non-transitory computer program product of claim 17, wherein the first filter modifies up to six rows of chroma sample values associated with a defined horizontal edge and wherein the second filter modifies up to two columns of chroma sample values associated with a defined vertical edge.

22. The non-transitory computer program product of claim 17, wherein the first filter modifies up to four rows of chroma sample values associated with a defined horizontal edge and wherein the second filter modifies up to two columns of chroma sample values associated with a defined vertical edge.

23. The non-transitory computer program product of claim 17, wherein the instructs that obtaining a plurality of neighboring arrays of reconstructed sample values includes instructs that sum residual blocks of video data and corresponding prediction blocks of video data.

24. An apparatus for filtering reconstructed video data, the apparatus comprising:
    means for obtaining an array of sample values, wherein the array is formatted according to a 4:2:2 chroma format;
    means for determining whether to apply a first filter to rows of chroma sample values associated with defined horizontal edges within the array, wherein the defined horizontal edges are separated by sixteen chroma sample values, without determining whether to apply the first filter to any horizontal edges other than the defined horizontal edges of the array;
    means for determining whether to apply a second filter, different from the first filter, to columns of chroma sample values associated with defined vertical edges within the array, wherein the defined vertical edges are separated by eight chroma sample values, without determining whether to apply the second filter to any vertical edges other than the defined horizontal edges of the array, wherein the second filter has a filter width that is smaller than a filter width of the first filter;
    means for applying the first filter to one or more of the rows in response to determining to apply the first filter to the one or more rows, without applying the second filter to any of the rows; and
    means for applying the second filter to one or more of the columns in response to determining to apply the second filter to the one or more columns, without applying the first filter to any of the columns.

25. The apparatus of claim 24, wherein determining whether to apply the second filter is based at least in part on the determination of whether to apply the first filter.

26. The apparatus of claim 25, wherein the first filter modifies up to six rows of chroma sample values associated with a defined horizontal edge and wherein the second filter is not applied if the first filter is applied.

27. The apparatus of claim 24, wherein the first filter modifies up to six rows of chroma sample values associated with a defined horizontal edge and wherein the second filter modifies up to four columns of chroma sample values associated with a defined vertical edge.

28. The apparatus of claim 24, wherein the first filter modifies up to six rows of chroma sample values associated with a defined horizontal edge and wherein the second filter modifies up to two columns of chroma sample values associated with a defined vertical edge.

29. The apparatus of claim 24, wherein the first filter modifies up to four rows of chroma sample values associated with a defined horizontal edge and wherein the second filter modifies up to two columns of chroma sample values associated with a defined vertical edge.

30. The apparatus of claim 24, wherein means for obtaining an array of sample values includes means for summing residual blocks of video data and corresponding prediction blocks of video data.

31. A method for filtering reconstructed video data, the method comprising:
    determining whether a video block is formatted according to one of a 4:2:2, or 4:4:4 chroma formats; and
    deblocking chroma edges of the video block based on the determined chroma format, the deblocking comprising:
        deblocking the chroma edges using a first set of filters, including a first filter and a second filter, wherein the second filter has a filter width that is smaller than a filter width of the first filter, when the video block is formatted according to a 4:2:2 chroma format, wherein the first set of one or more filters are based on an 8×16 deblocking grid and are different than a second set of filters based on an 8×8 deblocking grid that would be used if the video block were formatted according to 4:2:0 chroma format, wherein deblocking the chroma edges using the first set of filters comprises:
            determining whether to apply the first filter to one or more rows of chroma sample values associated with defined horizontal chroma edges of the video block that are separated by sixteen chroma sample values without determining whether to apply the first filter to any horizontal edges other than the defined horizontal edges of the video block; and
            determining whether to apply the second filter to one or more columns of chroma sample values associated with defined vertical chroma edges of the video block that are separated by eight chroma sample values without determining whether to apply the second filter to any vertical edges other than the defined horizontal edges of the video block, or
        deblocking the chroma edges using a third set of one or more filters, different than the first set of filters and the second set of filters, that are based on a 16×16 deblocking grid when the video block is formatted according to a 4:4:4 chroma format.

32. The method of claim 31, wherein determining whether the video block is formatted according to one of the 4:2:2 or 4:4:4 chroma formats includes determining the value of a chroma format index value included in a sequence parameter set (SPS).

33. An apparatus for filtering reconstructed video data, the apparatus comprising:
a memory configured to store video data; and
a video coding device configured to:
determine whether a video block of the video data is formatted according to one of a 4:2:0, 4:2:2, or 4:4:4 chroma formats;
deblock chroma edges of the video block using a first set of one or more filters if the video block is formatted according to a 4:2:0 format, wherein the first set of filters is based on an 8×8 deblocking grid,
deblock the chroma edges using a second set of filters, including a first filter and a second filter, wherein the second filter has a filter width that is smaller than a filter width of the first filter, different than the first set of filters, that are based on an 8×16 deblocking grid if the video block is formatted according to a 4:2:2 chroma format, wherein to deblock the chroma edges using the second set of filters, the video coding device is configured to:
determine whether to apply the first filter to one or more rows of chroma sample values associated with defined horizontal chroma edges of the video block that are separated by sixteen chroma sample values without determining whether to apply the first filter to any horizontal edges other than the defined horizontal edges of the video block; and
determine whether to apply the second filter to one or more columns of chroma sample values associated with defined vertical chroma edges of the video block that are separated by eight chroma sample values without determining whether to apply the second filter to any vertical edges other than the defined horizontal edges of the video block, and
deblock the chroma edges using a third set of one or more filters, different than the first set of filters and the second set of filters, based on a 16×16 deblocking grid if the video block is formatted according to a 4:4:4 chroma format.

34. The apparatus of claim 33, wherein to determine whether the video block is formatted according to one of the 4:2:0, 4:2:2, or 4:4:4 chroma formats, the video coding device is configured to determine the value of a chroma format index value included in a sequence parameter set (SPS).

35. A non-transitory computer program product comprising a computer-readable storage medium having instructions stored thereon that, when executed, cause one or more processors of a device for filtering reconstructed video data to:
determine whether a video block is formatted according to one of a 4:2:0, a 4:2:2, or a 4:4:4 chroma format; and
deblock chroma edges of the video block based on the determined chroma format, wherein the instructions that cause the processor to deblock the chroma edges comprise instructions that cause the processor to:
deblock the chroma edges using a first set of one or more filters that are based on an 8×8 deblocking grid if the video block is formatted according to a 4:2:0 chroma format,
deblock the chroma edges using a second set of filters, including a first filter and a second filter, wherein the second filter has a filter width that is smaller than a filter width of the first filter, different than the first set of filters, that are based on an 8×16 deblocking grid if the video block is formatted according to a 4:2:2 chroma format, wherein the instructions that cause the processor to deblock the chroma edges using the second set of filters comprise instructions that cause the processor to:
determine whether to apply the first filter to one or more rows of chroma sample values associated with defined horizontal chroma edges of the video block that are separated by sixteen chroma sample values without determining whether to apply the first filter to any horizontal edges other than the defined horizontal edges of the video block; and
determine whether to apply the second filter to one or more columns of chroma sample values associated with defined vertical chroma edges of the video block that are separated by eight chroma sample values without determining whether to apply the second filter to any vertical edges other than the defined horizontal edges of the video block, and
deblock the chroma edges using a third set of one or more filters, different than the first set of filters and the second set of filters, that are based on a 16×16 deblocking grid if the video block is formatted according to a 4:4:4 chroma format.

36. The non-transitory computer program product of claim 35, wherein the instructions that cause the processor to determine whether the video block is formatted according to one of the 4:2:0, 4:2:2, or 4:4:4 chroma formats include instructions that cause the processor to determine the value of a chroma format index value included in a sequence parameter set (SPS).

37. An apparatus for filtering reconstructed video data, the apparatus comprising:
means for determining whether a video block is formatted according to one of a 4:2:0, 4:2:2, or 4:4:4 chroma formats; and
means for deblocking chroma edges of the video block based on the determined chroma format, comprising:
means for deblocking the chroma edges using a first set of one or more filters that are based on an 8×8 deblocking grid if the video block is formatted according to a 4:2:0 chroma format,
means for deblocking the chroma edges using a second set of filters, including a first filter and a second filter, wherein the second filter has a filter width that is smaller than a filter width of the first filter, different from the first set of filters, that are based on an 8×16 deblocking grid if the video block is formatted according to a 4:2:2 chroma format, wherein the means for deblocking the chroma edges using the first set of filters comprises:
means for determining whether to apply the first filter to one or more rows of chroma sample values associated with defined horizontal chroma edges of the video block that are separated by sixteen chroma sample values without determining whether to apply the first filter to any horizontal edges other than the defined horizontal edges of the video block; and
means for determining whether to apply the second filter to one or more columns of chroma sample values associated with defined vertical chroma edges of the video block that are separated by eight chroma sample values without determining whether to apply the second filter to any vertical edges other than the defined horizontal edges of the video block, and means for deblocking the chroma edges using a third set of one or more filters, different from the first set of filters and the second set of filters, that are based on a 16×16 deblocking grid if the video block is formatted according to a 4:4:4 chroma format.

38. The apparatus of claim 37, wherein the means for determining whether a video block is formatted according to one of the 4:2:0, 4:2:2, or 4:4:4 chroma formats includes means for determining the value of a chroma format index value included in a sequence parameter set (SPS).

* * * * *